(12) United States Patent
Miu et al.

(10) Patent No.: US 10,999,198 B2
(45) Date of Patent: May 4, 2021

(54) CLOUD BASED ROUTER WITH POLICY ENFORCEMENT

(71) Applicant: Frontiir PTE Ltd, Singapore (SG)

(72) Inventors: Allen Ka Lun Miu, Fremont, CA (US); Myo Min Htun, Yangon (MM); Tun Tun Myint, Yangon (MM); Phyo Kyi Thein, Yangon (MM); Godfrey Tan, San Jose, CA (US)

(73) Assignee: FRONTIIR PTE LTD., Singapore (SG)

( * ) Notice: Subject to any disclaimer, the term of this patent is extended or adjusted under 35 U.S.C. 154(b) by 0 days.

(21) Appl. No.: 16/546,075

(22) Filed: Aug. 20, 2019

(65) Prior Publication Data
US 2020/0067841 A1 Feb. 27, 2020

Related U.S. Application Data

(60) Provisional application No. 62/720,710, filed on Aug. 21, 2018.

(51) Int. Cl.
*H04L 12/801* (2013.01)
*H04L 12/813* (2013.01)
*H04L 29/12* (2006.01)
*H04W 40/20* (2009.01)
(Continued)

(52) U.S. Cl.
CPC .......... *H04L 45/66* (2013.01); *H04L 12/4633* (2013.01); *H04L 45/74* (2013.01);
(Continued)

(58) Field of Classification Search
CPC ..... H04L 12/4641; H04L 47/14; H04L 45/14; H04L 47/20; H04L 45/66; H04L 12/4633;
(Continued)

(56) References Cited

U.S. PATENT DOCUMENTS

| | | |
|---|---|---|
| 8,839,409 B2 | 9/2014 | Cheriton |
| 2009/0238209 A1 | 9/2009 | Ju |

(Continued)

*Primary Examiner* — Brian D Nguyen
(74) *Attorney, Agent, or Firm* — Womble Bond Dickinson (US) LLP

(57) ABSTRACT

Cloud based router with policy enforcement. In some implementations, a system is provided. The system includes a plurality of access points. The plurality of access points receive data packets from a plurality of client devices. The system also includes a plurality of tunnel devices coupled to the plurality of access points. The plurality of tunnel devices generate encapsulated packets based on the data packets received by the plurality of access points. The system further includes a plurality of packet forwarding components coupled to the plurality of tunnel devices via a first set of tunnels. The plurality of packet forwarding components receive the encapsulated packets from the plurality of tunnel devices and forward the encapsulate packets. The system further includes a plurality of network access controllers coupled to the plurality of packet forwarding components via a second set of tunnels. The plurality of network access controllers enforce one or more network policies for the plurality of client devices, as the plurality of client devices move between the plurality of access points.

20 Claims, 10 Drawing Sheets

(51) Int. Cl.
*H04L 12/721* (2013.01)
*H04L 12/741* (2013.01)
*H04L 12/46* (2006.01)
*H04W 88/14* (2009.01)

(52) U.S. Cl.
CPC .............. *H04L 47/14* (2013.01); *H04L 47/20* (2013.01); *H04L 61/2592* (2013.01); *H04L 61/6022* (2013.01); *H04W 40/20* (2013.01); *H04L 2212/00* (2013.01); *H04W 88/14* (2013.01)

(58) Field of Classification Search
CPC ............. H04L 61/6022; H04L 61/2592; H04L 61/103; H04L 2212/00; H04W 40/20; H04W 88/14
See application file for complete search history.

(56) References Cited

U.S. PATENT DOCUMENTS

| | | |
|---|---|---|
| 2012/0327907 A1 | 12/2012 | Ding et al. |
| 2014/0237544 A1* | 8/2014 | Higuchi ................ H04L 63/168 726/3 |
| 2015/0327052 A1* | 11/2015 | Ghai .................... H04W 12/06 370/328 |
| 2016/0352628 A1* | 12/2016 | Reddy ..................... H04L 45/38 |
| 2017/0085502 A1* | 3/2017 | Biruduraju .......... H04L 12/4633 |
| 2017/0163601 A1 | 6/2017 | Chechani et al. |
| 2017/0272307 A1 | 9/2017 | Murphy et al. |
| 2019/0132150 A1* | 5/2019 | Ramachandran ... H04L 12/4633 |
| 2020/0029199 A1* | 1/2020 | Sen ..................... H04L 41/0806 |
| 2020/0029249 A1* | 1/2020 | Livanos ................ H04W 28/20 |

* cited by examiner

CLOUD BASED ROUTER WITH POLICY ENFORCEMENT

CROSS-REFERENCE TO RELATED APPLICATIONS

This application claims the benefit of U.S. Provisional Patent Application No. 62/720,710, filed on Aug. 21, 2018. The disclosure of the above-referenced application is hereby incorporated by reference in its entirety.

TECHNICAL FIELD

Aspects of the present disclosure relate to a network architecture, and more particularly, to a network architecture that uses network access controllers.

BACKGROUND

Client devices (e.g., computing devices such as smartphones, laptop computers, tablet computers, etc.) may communicate with a network via an access point. For example, a tablet computer may communicate with the Internet (e.g., a network) via an access point, such as Wi-Fi access point. One or more network access controllers may provide network policy handling or enforcement functions for the client devices and the access points. For example, a network access controller may control how long a client device is able to access a network or the network bandwidth (e.g., throughput, download speed, upload speed, etc.) for a client device.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Client devices (e.g., computing devices such as smartphones, laptop computers, tablet computers, etc.) may communicate with one or more networks via an access point. For example, a tablet computer may communicate with the Internet (e.g., a network) via an access point, such as Wi-Fi access point. One or more network access controllers may provide network policy handling or enforcement functions for the client devices and the access points. For example, a network access controller may control how long a client device is able to access a network or the network bandwidth (e.g., throughput, download speed, upload speed, etc.) for a client device.

As the number of client devices that access the one or more networks changes, the load on the network access controllers may also change. For example, the number of client devices that are handled by a network access controller may decrease or increase based on the number of client devices that may be using an access point at a given time. It may be difficult to add or remove network access controllers dynamically because network access controllers are generally configured to service one or more access points. In addition, due to resource or logistical reasons, different network access controllers may be deployed at different data centers or cloud computing platforms. If network access controllers in one data center fail or are taken offline (e.g., for maintenance), there may be network service disruptions for the client devices that use those network access controllers.

The present disclosure addresses the above-noted and other deficiencies by distributing client devices to different network access controllers. As the number of client devices change (e.g., as the number of client devices increase), the load among the network access controllers may be distributed to prevent a network access controller from being overloaded or underutilized. New network access controllers may be added and existing network access controllers may be removed. The client devices may be distributed among the new or remaining network access controllers.

Figure 1:
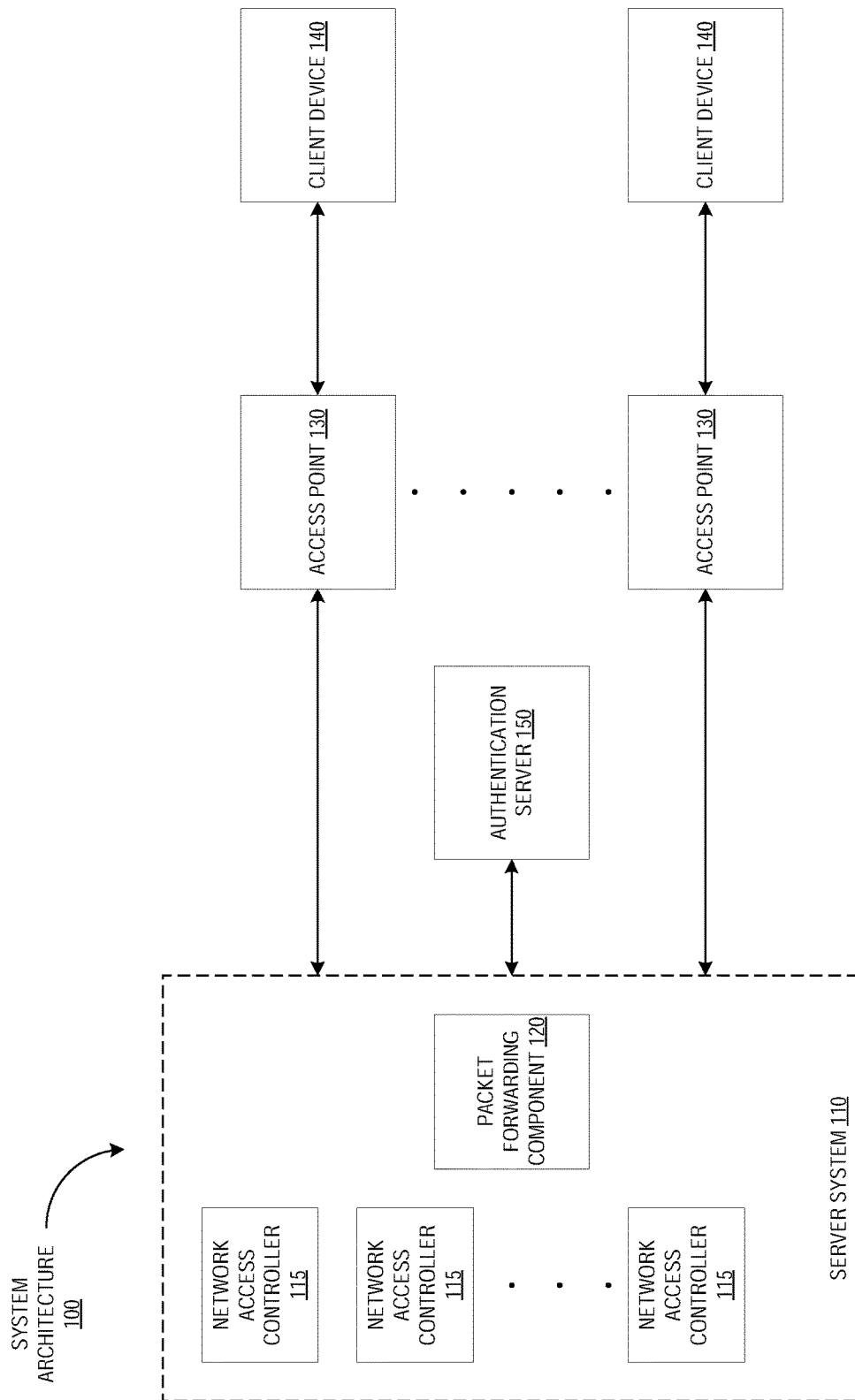
FIG. 1 is a block diagram that illustrates an example system architecture, in accordance with some embodiments of the present disclosure.

FIG. 1 is a block diagram that illustrates an example system architecture 100, in accordance with some embodiments of the present disclosure. The system architecture 100 includes a server system 110, an authentication server 150, access points 130, and client devices 140. The server system 110, the packet forwarding component 120, the authentication server 150, the access points 130, and the client devices 140 may be interconnected or coupled to each other (e.g., communicatively coupled) via one or more networks. The one or more networks may carry communications (e.g., data, message, packets, frames, other appropriate types or formats of data, etc.) between the server system 110, the packet forwarding component 120, the authentication server 150, the access points 130, and the client devices 140. A network may be a public network (e.g., the Internet), a private network (e.g., a local area network (LAN) or wide area network (WAN)), or a combination thereof. In one embodiment, a network may include a wired or a wireless infrastructure, which may be provided by one or more wireless communications systems, such as a wireless fidelity (Wi-Fi) hotspot connected with the network and/or a wireless carrier system that can be implemented using various data processing equipment, communication towers (e.g. cell towers), etc.

A computing device may be a device that may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A computing device may include any suitable type of device or machine that has a programmable processor including, for example, server computers, desktop computers, laptop computers, tablet computers, smartphones, set-top boxes, etc. In some examples, a computing device may include a single machine or may include multiple interconnected machines (e.g., multiple servers configured in a cluster). Each computing device may execute or include an operating system (OS), as discussed in more detail below. The OS of a computing device may manage the execution of other components (e.g., software, applications, etc.) and/or may manage access to the hardware (e.g., processors, memory, storage devices etc.) of the computing device.

A virtual machine (VM) may be a software implementation of a machine (e.g., a software implementation of a computing device) that includes its own operating system (referred to as a guest OS) and executes application programs, applications, software. A VM may execute on a hypervisor which executes on top of the OS for a computing device (referred to as a host OS). The hypervisor may also be referred to as a virtual machine monitor (VMM). The hypervisor may be a component of an OS for a computing device, may run on top of the OS for a computing device, or may run directly on host hardware without the use of an OS. The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications. The hypervisor may also present other software (e.g., "guest" software) the abstraction of one or more virtual machines (VMs). A VM may execute guest software that uses an underlying emulation of the physical resources (e.g., virtual processors and guest memory).

A container may be an isolated set of resources allocated to executing an application, software, and/or process independent from other applications, software, and/or processes. A container may execute on a container engine which executes on top of the OS for a computing device. The host OS (e.g., an OS of the computing device) may use namespaces to isolate the resources of the containers from each other. A container may also be a virtualized object similar to virtual machines. However, a container may not implement separate guest OS (like a VM). The container may share the kernel, libraries, and binaries of the host OS with other containers that are executing on the computing device. The container engine may allow different containers to share the host OS (e.g., the OS kernel, binaries, libraries, etc.) of a computing device. For example, the container engine may multiplex the binaries and/or libraries of the host OS between multiple containers. The container engine may also facilitate interactions between the container and the resources of the computing device. For example, the container engine may manage requests from container to access a memory (e.g., a RAM) of the computing device. In another example, the container engine may manage requests from the container to access certain libraries/binaries of the host OS. The container engine may also be used to create, remove, and manage containers. In one embodiment, the container engine may be a component of a host operating system. In another embodiment, container engine may run on top of a host operating system, or may run directly on host hardware without the use of a host operating system.

In one embodiment, an access point 130 may be a device that is on a boundary between a network service provider (e.g., an internet service provider, a cable service provider, a cellular service providers, etc.) and a consumer (e.g., a user of the client device 140). For example, the access point 130 may be a demarcation between the network boundary of the network service provider and the consumer. In another embodiment, the access point 130 may be consumer premise equipment (CPE). CPE may refer to devices that may be installed or located outside of the network boundary of the network service provider. For example, a CPE may be a wireless router (e.g., a network router) that is installed or located within a user's home.

As illustrated in FIG. 1, the server system 110 includes packet forwarding component 120, and network access controllers 115. Each of the packet forwarding component 120, and network access controllers 115 may be one or more of a computing device, a VM, or a container. The packet forwarding component 120 and network access controllers 115 may also be located on (e.g., may be installed on, may execute on, etc.) one or more of a computing device, a VM, or a container. In one embodiment, the server system 110 may be a data center or cloud computing architecture that includes multiple computing devices, such as server computers. In one embodiment, one of the network access controllers 115 the may be a default network access controller, as discussed in more detail below. For example, the topmost network access controller 115 may be the default network access controller.

In one embodiment, a network access controller (e.g., network access controller 115, etc.) may perform various functions, actions, operations, etc., related to providing the client devices 140 with access to one or more networks (e.g., a private or corporate network, the Internet, public networks such as Wi-Fi networks in airports, coffee shops, trains stations, etc., service provider networks, virtual network operators and carriers, etc.). In one embodiment, a network access controller may authenticate or authorize the client devices 140 or users of the client devices 140. For example, a network access controller may communicate with authentication server 150 to determine whether a user of a client device 140 is allowed to access a network via an access point 130, as discussed in more detail below. In another embodiment, a network access controller may provide network policy handling or enforcement functions. For example, a network access controller may determine the maximum throughput (e.g., maximum download speed) for a user or for a client device 140. In another example, a network access controller may determine the maximum amount or period of time that a user or client device 140 is allowed to access the one or more networks (e.g., a client device 140 may be allowed to access the one or more networks for one hour, one day, or some other appropriate period of time). In a further example, a network access controller may determine whether a user or client device 140 has access to server computers on one or more networks. In one example, a network access controller may also control the types of data that are transmitted or received. For example, the network access controller may prevent video data from being transmitted or received because video data often uses more bandwidth. In some embodiments, a group policy may be used to enforce network policies on a group of users or client devices 140. For example, a group policy may be used to control the download speed, amount of time, etc., for users who are enrolled in a particular subscription plan (e.g., an internet access subscription plan, a cable subscription plan, etc.) that allows the users to access networks via the access points 130.

In one embodiment, the authentication server 150 may include or may be coupled to a data store that includes an authentication table which includes user identifiers (e.g., usernames, logins, email addresses, legal names, etc.) and MAC addresses of network access controllers 115 that are associated with the user identifiers. For example, the authentication server 150 may include an authentication table (or other type of data structure or format) that indicates a MAC address of a network access controller 115 that is associated with each user identifier (e.g., each username) in the table. The authentication table may include a list of all of the user identifiers for all of the users who are allowed to communicate with the one or more networks (e.g., allowed to transmit data to and receive data from the one or more networks). A data store may be one or more devices that may be capable of storing data. Examples of data stores include but are not limited to, optical drives, hard disk drives (HDDs), solid state drives (SSDs), random access memory (RAM), cache, databases, network-attached storage (NAS) drives, portable hard disks, etc.

In one embodiment, a network access controller may encrypt data that is transmitted to the access points 130, and may decrypt data that is received from the access points 130. For example, data transmitted by a server (e.g., a remote server) to a client device 140 may be encrypted before the data is transmitted to the access point 130 to protect the data from unauthorized access by other devices or users. In another example, data transmitted received from a client device 140 may be decrypted before the data is transmitted to one or more networks. In another embodiment, a network access controller may also enforce one or more conditions for allowing users of client devices 140 to access to the one or more networks. For example, the network access controller may not allow a client device 140 to access the one or more networks unless the client device 140 has antivirus software installed.

In one embodiment, each network access controller 115 may instantiate and manage a different internet protocol (IP) subnet. A subnet may be a logical division of an IP network. Different client devices 140 may be part of different subnets based on which network access controller 115 a client device 140 uses. For example, a first client device 140 that uses a first network access controller 115 may be part of a first subnet, a second client device 140 that uses a second network access controller 115 may be part of a second subnet, etc.

As discussed above, a client device 140 may access one or more networks (e.g., the Internet, a private or corporate network, etc.) via an access point 130. For example, the access point 130 may be a wireless access point (e.g., a Wi-Fi access point) located in a store, coffee shop, a building for a company, etc. The access point 130 may be aware of the medium access control (MAC) address of the default network access controller 115. For example, the access point 130 may receive a message with the MAC address of the default network access controller 115 or an administrator may store the MAC address of the default network access controller 115 in a configuration file or parameter. In one embodiment, the access point 130 may receive packets (e.g., messages) from the client device 140. The access point 130 may replace the destination MAC address of the packets with the MAC address of the default network access controller. The access point 130 may replace the destination MAC address to cause the packets to be forwarded to the server system 110, because the default network access controller 115 is located in the server system 110 (e.g., within a data center or cloud computing architecture).

In one embodiment, the packets that are transmitted to the server system 110 may be received by the packet forwarding component 120 before the packets are transmitted (e.g., forwarded) to the network access controllers 115. For example, when a client device 140 transmits a packet to the server system 110, the packet forwarding component 120 may receive the packet first, and may forward the packet to one of the network access controllers 115, as discussed in more detail below.

In one embodiment, a client device 140 or user may be authenticated by the authentication server 150. For example, a client device 140 or user may transmit one or more authentication packets (e.g., one or more packets requesting authentication of the user or client device 140) to the authentication server 150 via an access point 130. The one or more authentication packets may include a user identifier (e.g., username) and password (or some other appropriate authentication information for authenticating a user or client device 140, such as a one-time password, a social security numbers of a user, etc.). The access point 130 may transmit (e.g., forward) the one or more authentication packets to the packet forwarding component 120 and the packet forwarding component 120 may transmit (e.g., forward) the one or more authentication packets to the authentication server 150. The authentication server 150 may authenticate the user identifier and password (or other appropriate information for authentication the user or client device 140), and may allow the client device 140 or the user access to the one or more networks if the user identifier and password are valid. The authentication server 150 may transmit authentication packets that indicate a response to the authentication packets (e.g., the authentication request) received from the client device. For example, the authentication server 150 may transmit a response indicating that the user was successfully authenticated, to the access point 130. The access point 130 may allow the client device 140 to access the one or more networks based on the response.

In one embodiment, the authentication server 150 may include attributes, fields, or parameters in the authentication packets (e.g., the authentication response) transmitted to the client device 140. The attributes may include a user identifier and a MAC address of the network access controller 115 that is associated with the user identifier. The authentication server 150 may obtain the user identifier and the MAC address of the network access controller 115 that is associated with the user identifier based on a table, as discussed above. The authentication server 150 may add the user identifier and the MAC address of the network access controller 115 that is associated with the user identifier prior to transmitting the authentication packets to the client device.

In one embodiment, the authentication server 150 may be a Remote Authentication Dial-In User Service (RADIUS) server and the authentication packets may be RADIUS packets. Although the present disclosure may refer to RADIUS, RADIUS server, or RADIUS packets, other types of authentication servers, authentication protocols, authentication packets, etc., may be used in the system architecture 100.

As discussed above, the packet forwarding component 120 may receive the packets that are transmitted by the client device 140 and may forward the packet to other devices or networks. The packet forwarding component 120 may forward packets between the client device and the authentication server 150. In one embodiment, the packet forwarding component 120 may analyze the authentication packets that are communicated between the client device 140 and the authentication server 150. The authentication packets communicated between the client device 140 may include attributes, fields, parameters, etc., that may indicate one of the one of the network access controllers 115 that should be used for a user. For example, the authentication packets may include attributes, fields, parameters, etc., that indicate a user identifier and the MAC address of a particular network access controller 115 (that should be used to perform the network policy handling or enforcement) for a particular user identified by the user identifier. The packets may also include a MAC address of the client device as a source MAC address when the client device 140 transmits the packet.

In one embodiment, the packet forwarding component 120 may store the association between the MAC address of the client device and the MAC address of a particular network access controller 115. For example, the packet forwarding component 120 may store the association between the MAC address of the client device and the MAC address of a particular network access controller 115 in a NAC table. In other embodiments, the NAC table may include an association between the MAC address of the client device, the MAC address of a network access controller 115, and a user identifier of a user (e.g., a user identifier or a user of the client device 140). The NAC table may be stored in a data store that is included in the network access controller 115 or coupled to the network access controller 115.

In some embodiments, the packet forwarding component 120 may obtain the NAC table or may update the NAC table using various other methods, functions, operations, techniques etc. For example, the packet forwarding component 120 may receive the NAC table from another computing device (e.g., another server or a database) in comma separated value (CSV) format or in JavaScript open notation format.

In one embodiment, the packet forwarding component 120 may receive a packet from a client device 140 via an ingress network interface of the packet forwarding component 120 (e.g., via a network port, a network interface, etc.). The packet may be forwarded to the server system 110 by an access point 130 and may be received by the packet forwarding component 120. The packet may include a destination MAC address that is the MAC address of the default network access controller 115 (e.g., is set to the MAC address of the default network access controller 115). The packet may also include a source MAC address that is the MAC address of the client device 140 (e.g., is set to the MAC address of the client device 140).

In one embodiment, the packet forwarding component 120 may access the NAC table (e.g., access data indicating associations between user identifiers and MAC addresses of network access controllers 115) and may determine or identify the MAC address of a network access controller 115 associated with the MAC address of the client device 140. The packet forwarding component 120 may identify which of the network address controllers 115 should receive the packet from the client device 140, based on the MAC address of the network access controller 115 that is associated with the MAC address of the client device 140 (e.g., the source MAC address of the packet transmitted by the client device 140). The packet forwarding component 120 may update (e.g., change, modify) the destination MAC address of the packet from the MAC address of the default network access controller, to the MAC address of the network access controller 115 associated with MAC address of the client device 140, based on the NAC table. The packet forwarding component 120 may then forward the packet to the network access controller 115 that is associated with the MAC address of the client device, via an egress network interface (e.g., via a network port, a network interface, etc.).

In one embodiment, the packet forwarding component 120 may receive a second packet, from a second client device 140, which includes the MAC address of the default network access controller 115 as the destination MAC address. The packet forwarding component 120 may determine or identify the source MAC address of the second packet which may indicate or identify the MAC address of the second client device 140. The packet forwarding component 120 may identify a network access controller 115 associated with the MAC address of the second client device 140 based on the NAC table, as discussed above. The packet forwarding component 120 may update (e.g., change, modify) the destination MAC address of the second packet from the MAC address of the default network access controller to the MAC address of the network access controller 115 that is associated with the MAC address of the second client device 140. The packet forwarding component 120 may forward the second packet to the network access controller 115 that is associated with the MAC address of the second client device 140 (e.g., to a second network access controller).

The packet forwarding component 120 may update the NAC table to reallocate or re-associate client devices 140 with different network access controllers 115 based on different algorithms, functions, parameters, criteria, conditions, etc. For example, the NAC may allocate the client devices 140 to network access controllers 115 based on utilization of the network access controllers 115 (e.g., re-associate client devices 140 with underutilized network access controllers 115). In another example, the packet forwarding component 120 may associate different client devices 140 with different network access controllers 115 based on the alphabetical order of user identifiers for users of the client devices 140. In a further example, the packet forwarding component 120 may associate different client devices 140 with different network access controllers 115 based geographical regions of the client devices 140, based on a user's subscription, or by analyzing the access points 130 used by the client device 140.

In one embodiment, the packet forwarding component 120 may perform load balancing functions for the server system 110. For example, the packet forwarding component 120 may forward packets from different client devices 140 to different network access controllers 115 to distribute the packets to different network access controllers 115. This may help prevent a network access controller 115 from being overloaded, may help prevent a network access controller 115 from being underutilized, and may allow for more efficient usage of the network access controllers 115. In one embodiment, the packet forwarding component 120 may be referred to as a load balancer. In another embodiment, the packet forwarding component 120 may be referred to as a centralized load balancer because the packet forwarding component 120 may be centrally located in the server system 110 (e.g., in a data center, in a cloud computing architecture, etc.). In one embodiment, the packet forwarding component 220 may forward packets to the same network access controller 215 regardless of which access point 230 a client device 240 is connected to. This may allow for internet protocol (IP) mobility. For example, this may allow the system architecture 200 to keep the client device 240 connected to the same IP subnet while the client device 240 moves (e.g., roams) from one access point 230 to another access point 230. Keeping the client device 240 connected to the same subnet may prevent the disruption or disconnection of network connections or client sessions between the client device 240 and other devices (e.g., server computers, other client devices, etc.).

In one embodiment, the packet forwarding component 120 may also allow network access controllers 115 to be added to or removed from the system architecture 100. For example, a network access controller 115 may be added and client devices 140 that were associated with other network access controllers 115 may be associated with the new network access controller 115. In another example, a network access controller 115 may be removed and the client devices 140 that were associated with the removed network access controller 115 may be associated with the remaining network access controllers 115. Reallocating or re-associating client devices 140 with different network access controllers 115 may allow the system architecture 100 to scale up or scale down based on the number of client devices 140 and access points.

Figure 2:
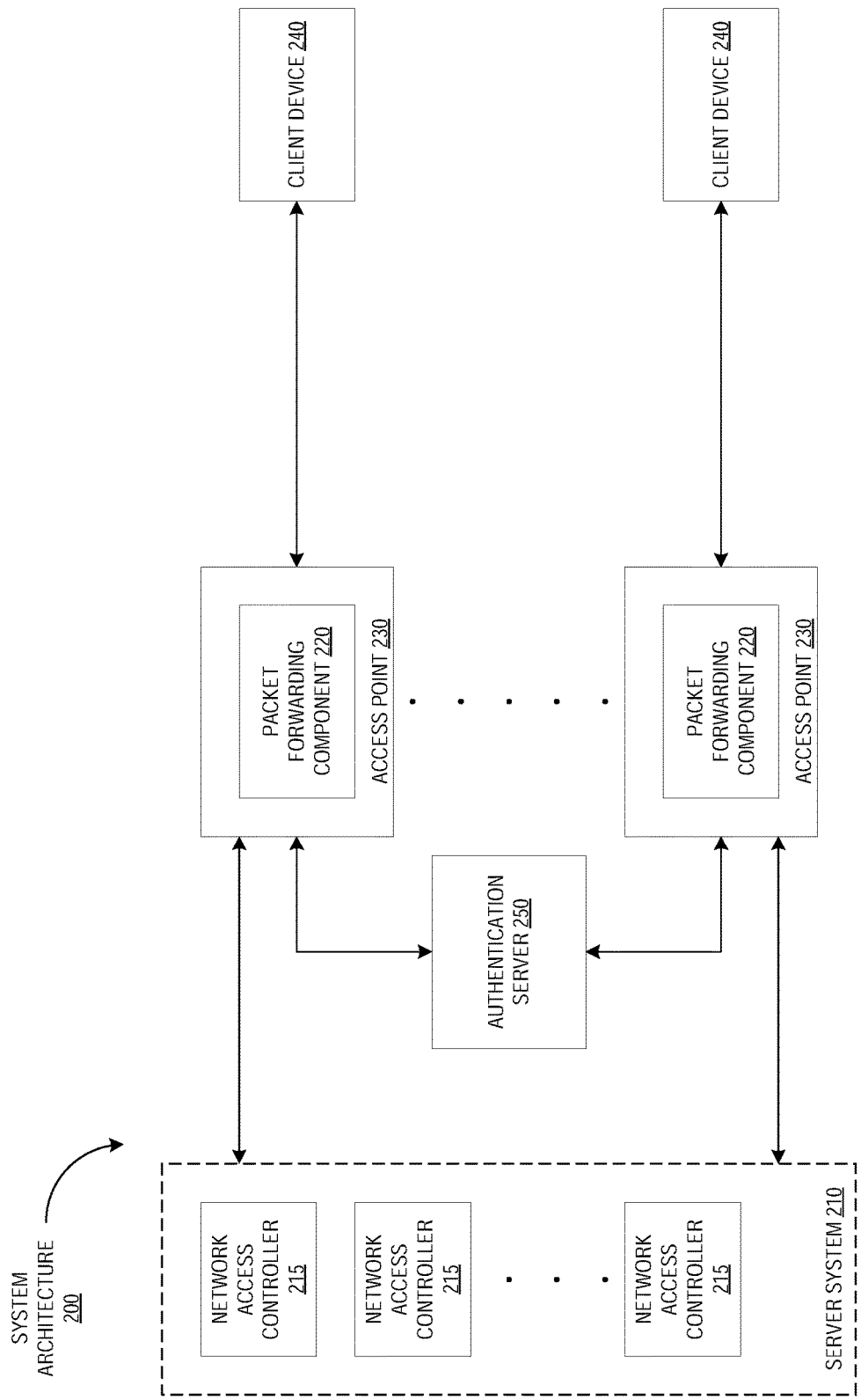
FIG. 2 is a block diagram that illustrates an example system architecture, in accordance with some embodiments of the present disclosure.

FIG. 2 is a block diagram that illustrates an example system architecture 200, in accordance with some embodiments of the present disclosure. The system architecture 200 includes a server system 210, an authentication server 250, access points 230, and client devices 240. The server system 210, the authentication server 250, the access points 230, and the client devices 240 may be interconnected or coupled to each other (e.g., communicatively coupled) via one or more networks, as discussed above. The one or more networks may carry communications (e.g., data, message, packets, frames, other appropriate types or formats of data, etc.) between the server system 210, the authentication server 250, the access points 230, and the client devices 240.

As illustrated in FIG. 2, the server system 210 includes packet forwarding component 220, and network access controllers 215. Each of the network access controllers 215 may be one or more of a computing device, a VM, or a container, as discussed above. In one embodiment, the server system 210 may be a data center or cloud computing architecture that includes multiple computing devices, such as server computers. In one embodiment, one of the network access controllers 215 the may be a default network access controller, as discussed above.

In one embodiment, a network access controller (e.g., network access controller 215, etc.) may perform various functions, actions, operations, etc., related to providing the client devices 240 with access to one or more networks (e.g., a private or corporate network, the Internet, etc.), as discussed above. In one embodiment, a network access controller may encrypt data that is transmitted to the access points 230, and may decrypt data that is received from the access points 230. In another embodiment, a network access controller may also enforce one or more conditions for allowing users of client devices 240 to access to the one or more networks. In some embodiments, each network access controller 215 may instantiate and manage a different IP subnet.

In one embodiment, the authentication server 250 may include or may be coupled to a data store that includes an authentication table that includes user identifiers (and MAC address of network access controllers 215 that are associated with the user identifiers, as discussed above. The authentication table may include a list of all of the user identifiers for all of the users who are allowed to communicate with the one or more networks.

In one embodiment, the packets that are transmitted to the server system 210 may be received by the packet forwarding component 220 before the packets are transmitted (e.g., forwarded) to the network access controllers 215. For example, when a client device 240 transmits a packet to the server system 210, the packet forwarding component 220 may receive the packet first, and may forward the packet to one of the network access controllers 215, as discussed in more detail below.

In one embodiment, a client device 240 or user may be authenticated by the authentication server 250. For example, a client device 240 or user may transmit one or more authentication packets (e.g., one or more packets requesting authentication of the user or client device 240) to the authentication server 250 via an access point 230. The one or more authentication packets may include a user identifier (e.g., username) and password (or some other appropriate information for authenticating a user or client device 240, such as a one-time password, a social security numbers of a user, etc.). The access point 230 may transmit (e.g., forward) the one or more authentication packets to the packet forwarding component 220 and the packet forwarding component 220 may transmit (e.g., forward) the one or more authentication packets to the authentication server 250. The authentication server 250 may authenticate the user identifier and password (or other appropriate information for authentication the user or client device 240), and may allow the client device 240 or the user access to the one or more networks if the user identifier and password are valid. The authentication server 250 may transmit authentication packets that indicate a response to the authentication packets (e.g., the authentication request) received from the client device. For example, the authentication server 240 may transmit a response indicating that the user was successfully authenticated, to the access point 230. The access point 230 may allow the client device 240 to access the one or more networks based on the response.

In one embodiment, the authentication server 250 may include attributes, fields, or parameters in the authentication packets (e.g., the authentication response) transmitted to the client device 240. The attributes may include a user identifier and a MAC address of the network access controller 215 that is associated with the user identifier. The authentication server 250 may obtain the user identifier and the MAC address of the network access controller 215 that is associated with the user identifier based on a table, as discussed above. The authentication server 250 may add the user identifier and the MAC address of the network access controller 215 that is associated with the user identifier prior to transmitting the authentication packets to the client device.

In one embodiment, the authentication server 250 may be a Remote Authentication Dial-In User Service (RADIUS) server and the authentication packets may be RADIUS packets. Although the present disclosure may refer to RADIUS, RADIUS server, or RADIUS packets, other types of authentication servers, authentication protocols, authentication packets may be used in the system architecture 200.

As illustrated in FIG. 2, each access point 230 includes a packet forwarding component 220. The packet forwarding component 220 may receive the packets that are transmitted by the client device 240 and forward the packet to other devices or networks. The packet forwarding component 220 may forward packets between the client device 240 and the authentication server 250. In one embodiment, the packet forwarding component 220 may analyze the attributes, fields, parameters, etc., of authentication packets that are communicated between the client device 240 and the authentication server 240 to identify one of the network access controllers 215 that should be used for a user, as discussed above.

In one embodiment, the packet forwarding component 220 may store the association between the MAC address of the client device and the MAC address of a particular network access controller 215 in a NAC table, as discussed above. In other embodiments, the NAC table may include an association between the MAC address of the client device, the MAC address of a network access controller 215, and a user identifier of a user (e.g., a user identifier or a user of the client device 240).

In some embodiments, the access points 230 may be configured or managed by a management server. The management server may provide the NAC table to the access points 230 as part of the management of the access points 230. For example, the management server may update settings or configurations of the access points 230. The management server may transmit a copy of the NAC table to the access points 130 and the access points 130 may store the NAC table in a data store (e.g., in a memory, a flash memory, etc.).

In one embodiment, the packet forwarding component 220 may receive a packet from a client device 240 and the packet may include a destination MAC address that is the MAC address of the default network access controller 215 (e.g., is set to the MAC address of the default network access controller 215). The packet may also include a source MAC address that is the MAC address of the client device 240 (e.g., is set to the MAC address of the client device 240).

In one embodiment, the packet forwarding component 220 may access the NAC table and may determine or identify the MAC address of a network access controller 215 associated with the MAC address of the client device 240. The packet forwarding component 220 may update the destination MAC address of the packet from the MAC address of the default network access controller, to the MAC address of the network access controller 215 associated with MAC address of the client device 240, based on the NAC table. The packet forwarding component 220 may then forward the packet to network access controller 215 that is associated with the MAC address of the client device.

In one embodiment, the packet forwarding component 220 may receive a second packet, from a second client device 240, which includes the MAC address of the default network access controller 215 as the destination MAC address. The packet forwarding component 220 may determine or identify the source MAC address of the second packet which may indicate or identify the MAC address of the second client device 240. The packet forwarding component 220 may identify a network access controller 215 associated with the MAC address of the second client device 240 based on the NAC table, as discussed above. The packet forwarding component 220 may update (e.g., change, modify) the destination MAC address of the second packet from the MAC address of the default network access controller to the MAC address of the network access controller 215 that is associated with the MAC address of the second client device 240. The packet forwarding component 220 may forward the second packet to the network access controller 215 that is associated with the MAC address of the second client device 240 (e.g., to a second network access controller).

The packet forwarding component 220 may update the NAC table to reallocate or re-associate client devices 240 with different network access controllers 215 based on different algorithms, functions, parameters, criteria, conditions, etc. In one embodiment, the packet forwarding component 220 may perform load balancing functions for the server system 210, as discussed above. This may help prevent a network access controller 215 from being overloaded, may help prevent a network access controller 215 from being underutilized, and may allow for more efficient usage of the network access controllers 215. In one embodiment, the packet forwarding component 120 may be referred to as a load balancer. In another embodiment, the packet forwarding component 120 may be referred to as a decentralized or distributed load balancer because the packet forwarding components 120 are distributed across different access points 230.

In one embodiment, when the packet forwarding component 120 updates the destination MAC address to the MAC address of the network access controller 215 associated with MAC address of the client device 240, the packet forwarding component 120 may help prevent Layer 2 MAC broadcast frames from entering server system 210. This may help the server system 210 by preventing broadcast packets from flooding the server system 210 (or networks included in or coupled to the server system 210). By removing broadcasts the server system 210 may be protected against a type of security vulnerability called address resolution protocol (ARP) Poisoning. For example, the client devices 240 may be protected against ARP poisoning. Also, removing broadcasts may allow the system architecture to scale up to a large number of access points 230 on the same layer 2 (L2) network. For example, thousands, millions, or some other appropriate number of access points 230, may be on the same L2 network when broadcast packets are not used.

Figure 3:
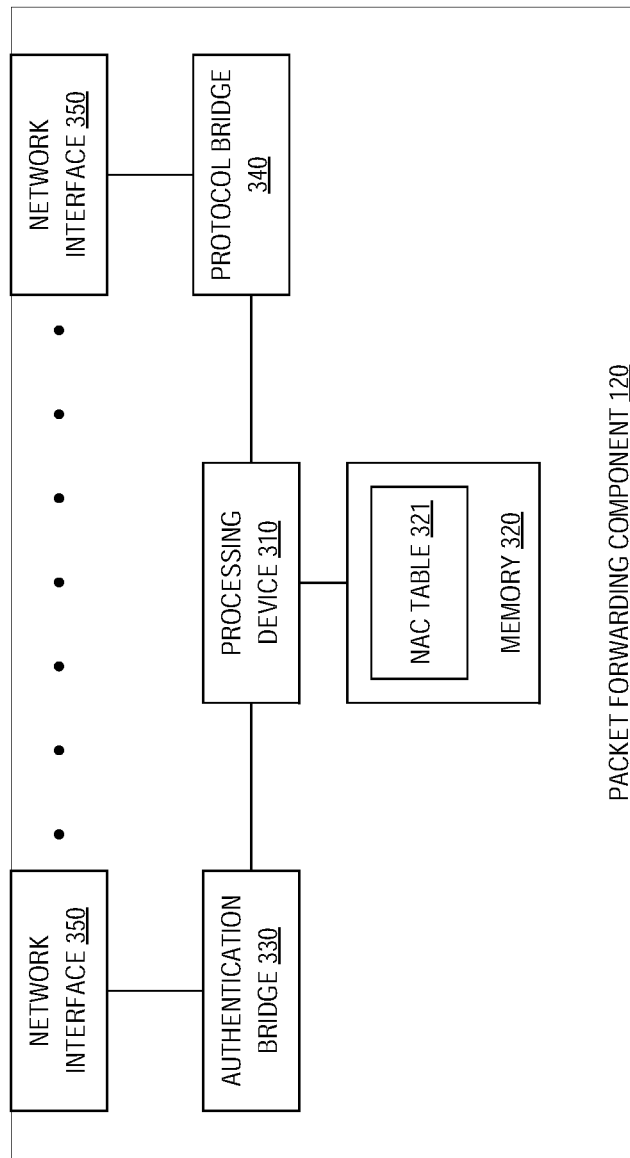
FIG. 3 is a block diagram of an example packet forwarding component, in accordance with some embodiments of the present disclosure.

FIG. 3 is a block diagram of an example packet forwarding component 120, in accordance with some embodiments. The packet forwarding component 120 includes a processing device 310 (e.g., a processor, a central processing unit, a multi-core processors, multiple processors, etc.). The packet forwarding component 120 also includes a memory 320 (e.g., a data store) coupled the processing device 310 is coupled to the memory 320.

An authentication bridge 330 is coupled to the processing device 310. The authentication bridge 330 may be hardware, firmware, software, or a combination thereof that communicates packets, such as authentication packets with an authentication server (e.g., authentication server 150 illustrated in FIG. 1) via a network interface 350. For example, authentication bridge 330 may include buses, queues, etc., that may be used to communicate packets with the authentication server.

A protocol bridge 340 is coupled to the processing device 310. The protocol bridge 340 may be hardware, firmware, software, or a combination thereof that communicates packets with one or more networks or devices (e.g., computing devices, servers, etc.). For example, the authentication bridge may include buses, queues, etc., that may be used to receive a packet from client device.

The network interfaces 350 may be interfaces or ports that may receive data from or transmit data to one or more networks or devices. In one embodiment, a network interface 350 may be an ingress interface that receives data (e.g., messages, packets, frames, etc.). In another embodiment, a network interface 350 may be an egress interface that transmits data. In a further embodiment, a network interface 350 may be both an egress interface and an ingress interface.

Figure 4:
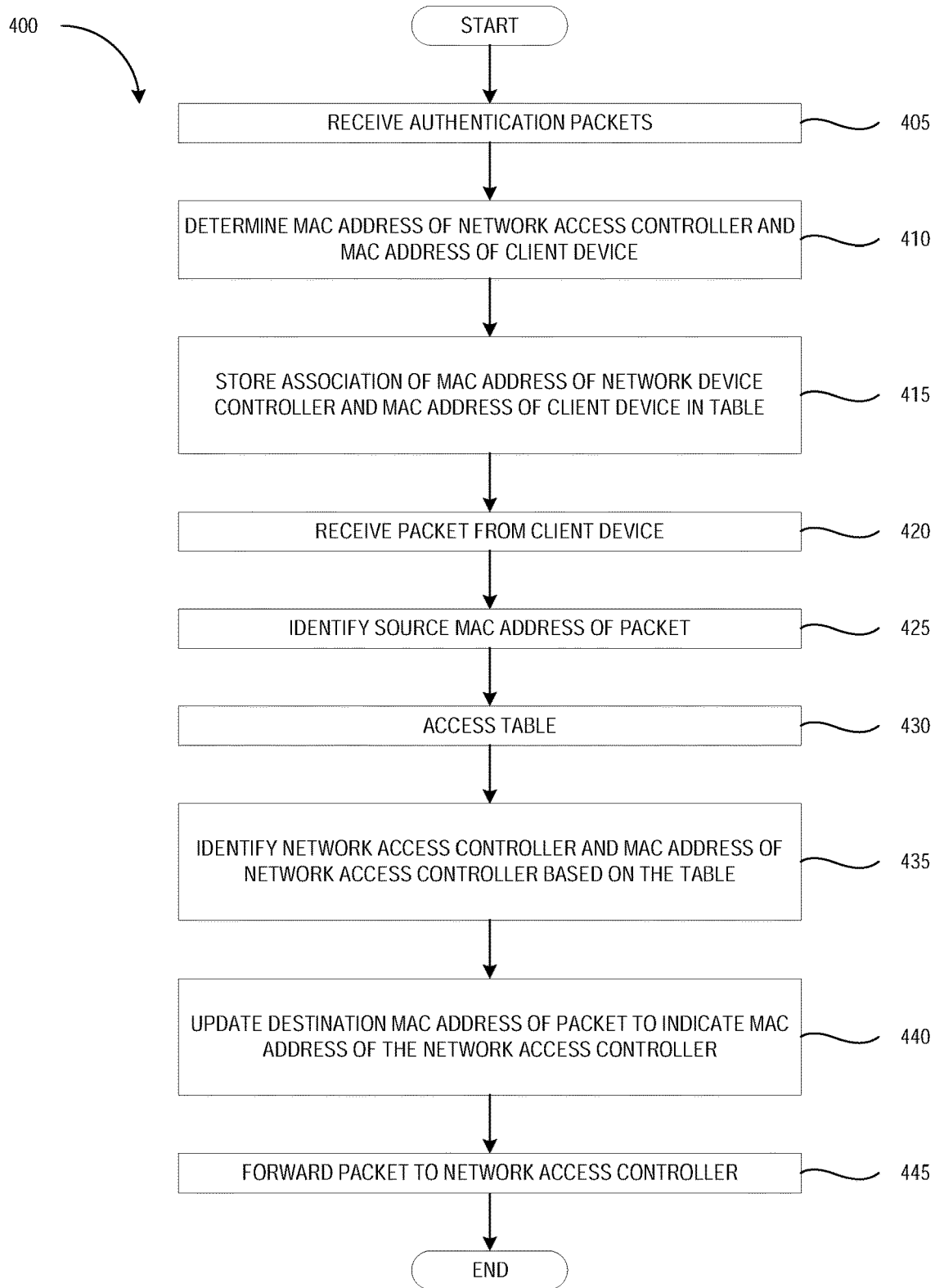
FIG. 4 is a flow diagram of a method of forwarding a packet, in accordance with some embodiments of the present disclosure.

FIG. 4 is a flow diagram of a method 400 of forwarding a packet, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a packet forwarding component, an access point, and/or a computing device.

The method 400 begins at block 405, where the method 400 may receive authentication packets (e.g., RADIUS packets) from a client device. At block 410, the method 400 may analyze the authentication packets and may determine one or more of user authentication information (e.g., username, password, user identifier, etc.), a MAC address of the client device, and a MAC address of a network access controller that is associated with the MAC address of the client device (e.g., associated with the client device). The method 400 may store an association between the MAC address of the client device and the MAC address of the network access controller in a table at block 415.

At block 420, the method 400 may receive a packet from client device. For example, the client device may transmit a packet to another network or another device. The destination MAC address of the packet may be the MAC address for a default network access controller. The method 400 may identify the source MAC address of the packet at block 425. At blocks 430 and 435, the method 400 may access the table to identify the network access controller and the MAC address of the network access controller that is associated with the MAC address of the client device, based on the table. At block 440 the method 400 may update the destination MAC address of the packet from the MAC address of the default network access controller to the MAC address of the network access controller that is associated with the client device. At block 445, the method 400 may forward the packet to the network access controller that is associated with the client device.

Figure 5:
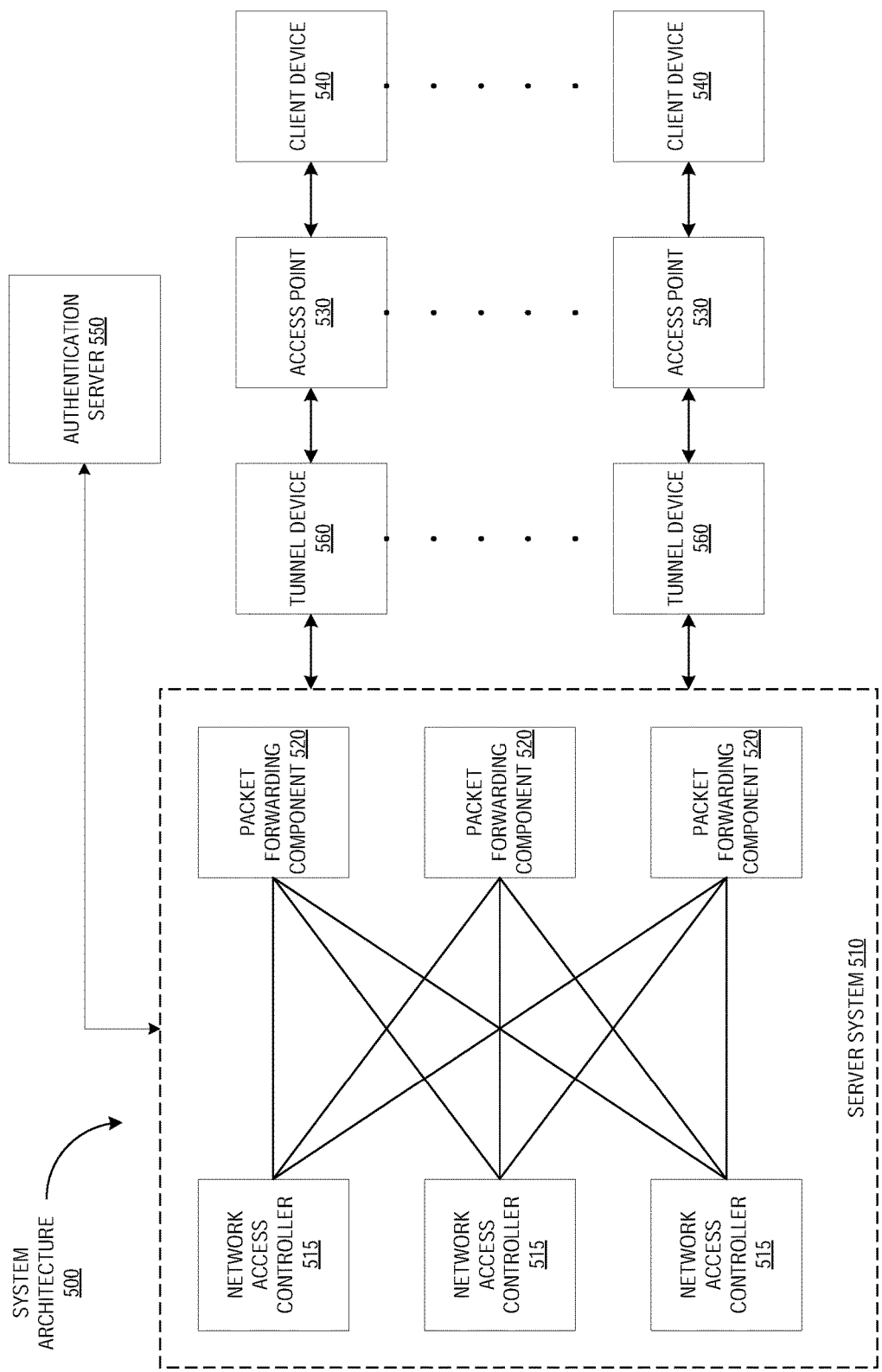
FIG. 5 is a block diagram that illustrates an example system architecture, in accordance with some embodiments of the present disclosure.

FIG. 5 is a block diagram that illustrates an example system architecture 500, in accordance with some embodiments of the present disclosure. The system architecture 500 includes a server system 510, an authentication server 550, tunnel devices 560, access points 530, and client devices 540. The server system 510, the authentication server 550, the access points 530, the tunnel devices 560, and the client devices 540 may be interconnected or coupled to each other (e.g., communicatively coupled) via one or more networks. The server system 510 includes network access controllers 515 and packet forwarding components 520. The network access controllers 515 and packet forwarding components 520 may also be interconnected or coupled to each other via one or more networks. The one or more networks may carry communications (e.g., messages, packets, frames, etc.) between the server system 510, the authentication server 550, the access points 530, the tunnel devices 560, and the client devices 540. The one or more networks may include a combination of public networks, private networks, wide area networks, metropolitan area networks, wired networks, wireless, networks, etc.

In one embodiment, the server system 510 may be located in one or more data centers or cloud computing architectures (e.g., clouds) that includes multiple computing devices, such as server computers. For example, some of the network access controllers 515 and some of the packet forwarding components 520 may be located in different data centers or clouds. In another example, all of the network access controllers 515 and the packet forwarding components 520 may be located in the same data center or cloud.

Each of the network access controllers 515, packet forwarding components 520, tunnel devices 560, access points, 530, client devices 540, and authentication server 550 may be one or more of a computing device, a VM, or a container. A computing device may be a device that may include hardware such as processing devices (e.g., processors, memory (e.g., RAM), storage devices (e.g., HDDs, SSDs), and other hardware devices (e.g., a video card), as discussed above. A computing device may include any suitable type of device or machine that has a programmable processor. A VM may be a software implementation of a computing device) that includes its own operating system (referred to as a guest OS) and executes application programs, applications, software. A VM may execute on a hypervisor which may manage system resources, including access to hardware devices (e.g., a physical processor, a physical memory or storage device, etc.). The hypervisor may also emulate the physical resources or hardware which may be used by the VMs to execute software/applications. A container may be an isolated set of resources allocated to executing an application, software, and/or process independent from other applications, software, and/or processes, as discussed above. A container may execute on a container engine which executes on top of the OS for a computing device which may allow different containers to share the host OS (e.g., the OS kernel, binaries, libraries, etc.) of a computing device.

Referring to FIG. 1, a packet forwarding component 120 may receive packets from one or more access points 130. Each access point 130 may forward the packets to packet forwarding component 120. In some situations or conditions, using a single or central packet forwarding component (as illustrated in FIG. 1) may cause a bottleneck, slowdown, etc., in processing or forwarding packets. For example, if one packet forwarding component 120 is used in the system architecture 100, then the one packet forwarding component 120 may be the only device that processes or forwards each packet from all of the access points 130 to the network access controllers 115. Thus, the amount of packets that may be processed or forwarded may be limited by the capabilities or resources of the packet forwarding component 120. For example, the capabilities or resources of the single packet forwarding component 120 may be a limiting factor (e.g., a bottleneck) on the amount of packets that may be processed and transmitted using the system architecture 100.

One method to increase the capabilities of the system architecture 100 may be vertical scaling. Vertical scaling may refer to adding or increasing the capabilities or resources of the single packet forwarding component 120. For example, adding additional processing devices (e.g., processors or CPUs), adding faster or additional memory, adding specialized hardware devices such as specialized network interface cards or network controllers, adding more complex operating system/software to optimize memory accesses and process interrupts with low latency and high speed, etc., may be used to vertically scale the capabilities or resources of the packet forwarding component 120. However, there may be a limit how much the single packet forwarding component 120 may be vertically scaled. For example, there is a limit to the number of processing devices, amount of memory, etc., that may be added to the single packet forwarding component 120.

Another way to increase the capabilities of the system architecture 100 may be horizontal scaling. Horizontal scaling may refer to adding additional packet forwarding components to the system architecture 100. For example, tens, hundreds, or thousands of packet forwarding components may be added to the system architecture 100. Horizontal scaling may allow for better scaling of the resources and capabilities of the system architecture 100. For example, each of the multiple packet forwarding components may forward or process packets from a subset of the access points 130. Thus, the forwarding or processing of packets is distributed among multiple packet forwarding components, rather than a single packet forwarding component 120. Horizontal scaling may be a more efficient method for increasing the capabilities of the system architecture 100 and may allow for more expandability in the future (e.g., may allow for a larger number of an unlimited number of packet forwarding components and network access controllers to be added).

However, simply adding additional packet forwarding components to the system architecture 100 may result in more difficulties, issues, problems, etc., for the system architecture 100. For example, the system architecture 100 may use layer 2 or data link layer packets (e.g., Ethernet frames). It may be more difficult for the system architecture to reroute layer 2 packets if network devices (e.g., switches, routers, etc.) or links (e.g., data links, connections, etc.) that interconnect the access points 130, the packet forwarding component 120, and the network access controllers 115, become unavailable. For example, if a switch between an access point 130 and the packet forwarding component 120 becomes unavailable, it may be difficult for the system architecture 100 to reroute the packets through other network devices. In addition, the network devices that interconnect the access points 130, the packet forwarding component 120, and the network access controllers 115 may store the MAC addresses of many or all of the client devices 140 in the system architecture because the system architecture 100 may directly forward layer 2 or data link layer packets between access points 130, the packet forwarding component 120, and the network access controllers 115. This may cause the network devices to use more space in their forwarding tables to store the MAC addresses of many or all of the client devices. Network devices that are capable of storing the MAC addresses of the client devices may be more expensive to purchase or operate. Furthermore, if layer 2 packets are used between access points 130, multiple packet forwarding components, and the network access controllers 115, duplicate layer 2 packets may be forwarded to the same network access controller 115. For example, if an access point 130 were to broadcast layer 2 packets to multiple packet forwarding components 120, each packet forwarding component 120 may forward the layer 2 packets to the same network access controller 115, which results in duplicate layer 2 packets arriving at the network access controller 115. The duplicate layer 2 packets may waste network capacity or bandwidth in the network system 110. In addition, the network access controller 115 may waste computing or storage resources determining which layer 2 packets are duplicates. Although an access point 130 may be modified to selectively cycle through the (e.g., cycle through from the first packet forwarding component 120 to the last packet forwarding component) or randomly select a packet forwarding component, this would increase the complexity or cost of the access point 130. In addition, some access points 130 may not support this feature or function (e.g., to randomly select a packet forwarding component 120).

In one embodiment, an access point 530 may be a device that is on a boundary between a network service provider (e.g., an internet service provider) and a consumer (e.g., a user of the client device 540). The access point 530 may represent a demarcation between the network boundary of the network service provider and the consumer. An example of an access point 530 may be a CPE, such as a wireless router, a cable mode, a digital subscriber line (DSL) modem, etc., that is installed or located within a user's home.

As discussed above, a client device 540 may access one or more networks (e.g., the Internet, a private or corporate network, etc.) via an access point 530 (e.g., a Wi-Fi access point located in a store, coffee shop, a building for a company, etc.). The access points 530 may receive layer 2 packets or data link layer packets with the client devices 540. The access points 530 may forward the layer 2 packets or data link layer packets to the tunnel devices 560. The access point 530 may be aware of the medium access control (MAC) address of a default network access controller 515, as discussed above. In one embodiment, the access point 530 may modify, update, etc., the destination MAC address of the layer 2 packets (e.g., data link layer packets) with the MAC address of the default network access controller, as discussed above. The access point 530 may forward the modified layer 2 packets to a tunnel device 560.

As illustrated in FIG. 5, multiple access points 530 may be coupled (e.g., communicatively coupled) to a tunnel device 560. For example, each tunnel device 560 may be coupled to a set of access points 530. The set of access points 530 may be located in a geographical area or location. For example the set of access points may be located within a few city blocks, within a neighborhood, etc. Thus, each tunnel device 560 may receive layer 2 packets from client devices 540 that are located within the geographical area or location.

In one embodiment, a tunnel device 560 may be connected to the one of the packet forwarding components 520 via a tunnel. A tunnel may be a communication channel that encapsulates packets received at a first end of the communication channel and then forwards or sends the encapsulated packet through the communication channel to a second end. An encapsulated packet may be a packet that includes another packet its payload. Various types of tunnels or tunneling protocols may be used for the tunnel. For example, the tunnel may be a secure shell (SSH) tunnel, a virtual private network (VPN) tunnel, a layer 2 tunneling protocol (L2TP) tunnel, a generic routing encapsulation (GRE) tunnel, a virtual extensible LAN (VXLAN) tunnel, etc.

In one embodiment, a tunnel device 560 may receive layer 2 packets from a set of access points 530 and may encapsulate those packets to generate encapsulated packets. For example, the tunnel device 560 may generate encapsulated packets based on the layer 2 packets received from the access points 530. The encapsulated packets may be layer 3 packets. For example, the encapsulated packets may be IP packets, which include the layer 2 packets (e.g., Ethernet frames) in their payloads. Thus, the encapsulated packet may belong to a higher network layer than the layer 2 packets. For example, referring to the Open Systems Interconnection (OSI) model, the layer 2 packets may belong to the data link layer and the encapsulated packets may belong to the network layer. The tunnel device 560 may be coupled to one of the packet forwarding components 520 via a tunnel. The tunnel device 560 may forward or transmit the encapsulated packets to a packet forwarding component 520 via the tunnel.

In one embodiment, the tunnel may allow the tunnel device 560 to be more easily reconnected to different packet forwarding components 520. If a tunnel device 560 is coupled to a first packet forwarding component 520 via the tunnel and the first packet forwarding component 520 becomes inoperable or unavailable (e.g., crashes, restarts, fails, etc.), the tunnel devices 560 may be connected to a second packet forwarding component 520 via a second tunnel. For example, the tunnel device 560 may automatically establish the second tunnel with the second packet forwarding component 520. In another example, the packet forwarding component 520 may receive data (e.g., a message) indicating which other packet forwarding component 520 the tunnel device 560 should use. A tunnel device 560 may transmit an encapsulated packet to a packet forwarding component 620 via a respective tunnel. The encapsulated packet may include a destination MAC address that is the MAC address of the default network access controller 515 and a source MAC address that is the MAC address of the client device 540.

In one embodiment, the tunnel devices 560 may help reduce the number of connections, communication channels, tunnels, etc., that may be coupled to a packet forwarding component 520. For example, by aggregating multiple access points 530 through a tunnel device 560, the individual access points 530 are not coupled to the packet forwarding component 520. This allows the packet forwarding component 520 to have a single connection to a tunnel device 560 rather than multiple connections to the access points 530 that are coupled to the tunnel device 560. For example, if there are thirty access points 530 coupled to a tunnel device 560, the packet forwarding component 520 may be able to receive packets from all thirty access points 530 via one tunnel to the tunnel device, rather than via thirty connections to each of the individual access points 530.

As discussed above, the packet forwarding components 520 may perform load balancing functions for the server system 510. In one embodiment, a packet forwarding component 520 may forward packets from a client device to the same network access controller 515 regardless of which access point 530 the client device is connected to. The packet forwarding component 520 may determine which network access controller 515 to forward a packet to, based on a NAC table. The packet forwarding components 520 may be coupled to the network access controllers 525 via one or more tunnels.

In another embodiment, the packet forwarding component 520 may also allow network access controllers 515 to be added to or removed from the system architecture 500. For example, a network access controller 515 may be added or removed and one or more client device 540 may be re-associated with or reallocated to a different network access controller 515 after the network access controller 515 is added or removed. The tunnels between a tunnel device 560 and the removed network access controller 515 may be redirected or reestablished with another network access controller 515. Reallocating or re-associating client devices 540 with different network access controllers 515 may allow the system architecture 500 to scale up or scale down based on the number of client devices 540 and access points.

In one embodiment, a network access controller 515 may perform various functions, actions, operations, etc., related to providing the client devices 540 with access to one or more networks (e.g., a private or corporate network, the Internet, public networks Wi-Fi networks, service provider networks, etc.). A network access controller 515 may authenticate or authorize the client devices 540 before providing the client devices 540 with access to one or more networks (e.g., with access to the internet). In another embodiment, a network access controller may provide network policy handling or enforcement functions (e.g., enforce a max download speed, enforce a data limit, etc.). In some embodiments, a group policy may be used to enforce network policies on a group of users or client devices 540. For example, a group policy may be used to control the download speed, amount of time, etc., for multiple users who are enrolled in a particular subscription plan (e.g., an internet access subscription plan, a family plan, a shared plane, a group subscription, etc.).

In one embodiment, a network access controller 515 may allow one or more client devices 540 to access other networks via the network access controller 515. For example, a network access controller 515 may allow a client device to send and receive data (e.g., packets) to and from the internet, a private corporate network, etc. Because the packets communicated between the client devices 540 and the other networks are routed through the network access controller 515, this may allow a network access controller 515 to act as a central entity or component that enforces network polices or group policies on one or more client devices 540, similar to a router (e.g., a home router, a DSL mode, a cable mode, etc.).

In one embodiment, a network access controller 515 may encrypt data that is transmitted to the access points 540, and may decrypt data that is received from the access points 540, as discussed above. In another embodiment, each network access controller 515 may instantiate and may manage a different internet protocol (IP) subnet (e.g., a logical division of an IP network). Different client devices 540 may be part of different subnets based on which network access controller 515 a client device 540 uses.

In one embodiment, the authentication server 150 may use an authentication table to authenticate client devices 540. The authentication table may include user identifiers (e.g., usernames, logins, email addresses, legal names, etc.) and MAC addresses of network access controllers 515 that are associated with the user identifiers. The authentication table may associate a MAC address of a network access controller 515 with each user identifier. The authentication table may include a list of the user identifiers for users who are allowed to communicate (e.g., transmit or receive packets) with the one or more networks via the network access controller 515. A client device 540 may transmit one or more authentication packets (e.g., one or more packets requesting authentication of the user or client device 540) to the authentication server 150 via an access point 530. The one or more authentication packets may include credentials (e.g., a user identifier, a password, etc.). The access point 530 may transmit (e.g., forward) the one or more authentication packets to the packet forwarding component 520 and the packet forwarding component 520 may transmit (e.g., forward) the one or more authentication packets to the authentication server 550. The authentication server 150 may authenticate the user identifier and password (or other appropriate information for authentication the user or client device 540), and may allow the client device 540 or the user access to the one or more networks if the user identifier and password are valid. The authentication server 550 may transmit authentication packets that indicate a response to the authentication packets (e.g., the authentication request) received from the client device. For example, the authentication server 550 may transmit a response indicating that the user was successfully authenticated, to the access point 530. The access point 530 may allow the client device 540 to access the one or more networks based on the response.

In one embodiment, the authentication server 550 may store or record attributes, fields, or parameters in the authentication packets (e.g., the authentication response) transmitted to and from the client device 540. The attributes may include a user identifier and a MAC address of the network access controller 515 that is associated with the user identifier. The authentication server 550 may add the user identifier and the MAC address of the network access controller 515 that is associated with the user identifier prior to transmitting the authentication packets to the client device. The authentication server 550 may also store the MAC address of the client device 540 that transmitted the authentication packets. The user identifier, Mac address of the network access controller 515, and the MAC address of the client device 540 may be associated with each other and stored in a table (e.g., stored as a row in a table). In one embodiment, the authentication server 550 may be a RADIUS server and the authentication packets may be RADIUS packets. Other types of authentication servers, authentication protocols, authentication packets, etc., may be used in the system architecture 500.

In one embodiment, the network access controllers 515 may use the attributes stored in the table of the authentication server 550 when processing packets from client devices 540. For example, the network access controller 515 may use the client MAC address stored in the table to determine which user identifier is associated with the MAC address. This may allow the network access controller 515 to identify a subscription or plan for a client MAC address (e.g., for a client device 540).

In one embodiment, multiple authentication servers may be used (not illustrated in the figures). Each of the multiple authentication servers may be associated with different groups of network access controllers 515. For example, a certain network access controller 515 may forward authentication packets to a certain authentication server. This association of network access controllers 515 and authentication servers may allow the network access controllers 515 to continue identifying subscriptions for users based on client MAC addresses, even if multiple authentication servers are used.

As discussed above, the packet forwarding component 520 may receive the packets that are transmitted by the client device 540 and may forward the packet to other devices or networks. The packet forwarding component 520 may forward packets between the client device and the authentication server 150. In one embodiment, the packet forwarding component 520 may analyze the authentication packets that are communicated between the client device 540 and the authentication server 550. The authentication packets communicated between the client device 540 may include attributes, fields, parameters, etc., that may indicate one of the one of the network access controllers 515 that should be used for a user. For example, the authentication packets may include attributes, fields, parameters, etc., that indicate a user identifier and the MAC address of a particular network access controller 515 (that should be used to perform the network policy handling or enforcement) for a particular user identified by the user identifier. The packets may also include a MAC address of the client device as a source MAC address when the client device 540 transmits the packet.

In one embodiment, a packet forwarding component 520 may establish a tunnel (e.g., a GRE tunnel, a VPN tunnel, a L2TP tunnel, etc.) with one or more tunnel devices 560 (e.g., one tunnel for each tunnel device 560). Either the packet forwarding component 520 or the tunnel device 560 may initiate the establishment of the tunnel. The packet forwarding component 520 may also establish a tunnel with one or more network access controllers 515. For example, the packet forwarding component 520 may establish tunnels to each or the network access controllers 515. In another example, the packet forwarding component may establish one or more tunnels to a subset of the network access controllers 515. Either the packet forwarding component 520 or the network access controller 515 may initiate the establishment of the tunnel.

In one embodiment, the packet forwarding component 520 may receive an encapsulated packet from a tunnel device 560 via a tunnel between the packet forwarding component 520 and the tunnel devices 560. As discussed above, the tunnel device 560 may generate the encapsulated packet based on a data packet (e.g. a layer 2 packet) received from a client device 540. The encapsulated packet may be a higher layer packet (e.g., a layer 3 or network layer packet) and the payload of the encapsulated packet may include a lower layer packet (e.g., a layer 2 or data link layer packet).

The packet forwarding component 520 may access a NAC table to determine which one of the network access controllers 515 should receive an encapsulated packet (e.g., which network access controller 515 to forward the encapsulated packet to). The NAC table may include data indicating associations between one or more of user identifiers, MAC addresses of client devices 540, and MAC addresses of network access controllers 515. The associations may indicate which of the multiple network access controllers 515 should be used for a particular client device 540 or user. For example, the associations may indicate which of the packet forwarding components 520 has been allocated to or is appropriate for a client device 540. The packet forwarding component 520 may update or modify the destination MAC address of the packet from the MAC address of the default network access controller, to the MAC address of the appropriate network access controller 515 associated with the MAC address of the client device 540, based on the NAC table. The packet forwarding component 520 may then forward the packet to the network access controller 515 that is associated with the MAC address of the client device. In some embodiments, the packet forwarding component 520 may obtain the NAC table or may update the NAC table, as discussed above. For example, the packet forwarding component 520 may receive the NAC table from another computing device (e.g., a server computer) in a CSV format, a JSON format, or an extensible markup language (XML) format. In another example, the packet forwarding component 520 may receive the NAC table based on user input received from a user (e.g., a network administrator) via an interface (e.g., via a graphical user interface (GUI), a command line interface (CLI), etc.). The NAC table for a packet forwarding component 520 may also be updated. For example, a server computer may periodically transmit new NAC tables to the packet forwarding components 520. The packet forwarding component 520 may update the NAC table to reallocate or re-associate client devices 540 with different network access controllers 515 based on different algorithms, functions, parameters, criteria, conditions, etc., as discussed above. In one embodiment, the NAC table or packet forwarding component 520 may associate different client devices 540 with different network access controllers 515 based on geographical regions of the client devices 540. For example, all client devices 540 in a geographical region (e.g., a few blocks, a city, a county, a state, a province, etc.) may be allocated or associated with a certain network access controller 515. In another embodiment, the NAC table or packet forwarding component 520 may associate different client devices 540 with different network access controllers 515 based on a different subscriptions or network plans. For example, multiple client devices 540 may be part of a group plan (e.g., a family plan). The client devices 540 that are in a group plan may be allocated to or associated with the same network access controller 515. In another example, client devices 540 that are associated with different subscription levels may be associated with different network access controllers 515. Client devices 540 that use a more expensive subscription plan (e.g., a subscription plan that allows more speed or throughput, which allows for a higher data limit or data usage, etc.) may be allocated or associated with a first network access controller. Client devices 540 that use a less expensive subscription plane (e.g., a subscription plan that allows less speed or throughput, that allows for a lower data limit or data usage, etc.) may be allocated or associated with a second network access controller 515. This may allow the server system 510 to prioritize packets or traffic when there is network congestion or reduce network capacity (e.g., packets form client devices in more expensive subscription plans may be prioritized). In another example, certain types of subscriptions may be grouped or associated with certain network access controllers 515. For example, certain subscription plans be for users who stream videos or play video games. These video game or streamlining video subscription plans may be associated with certain network access controllers 515 which may be allocated specifically to process and forward packets for the streaming videos or video games. In a further example, certain users may be beta testers who may be grouped onto certain network access controllers 515 which may provide the users access to different features or services.

In one embodiment, the packet forwarding component 520 may forward or transmit an encapsulated packet to a network access controller 515 that was identified or selected based on the NAC table. The packet forwarding component 520 may transmit the encapsulated packet to the identified network access controller 515 via a tunnel between the packet forwarding component 520 and the identified network access controller 515. In some embodiments, the packet forwarding component 520 may forward packets to the same network access controller 515 regardless of which access point 530 a client device 540 is connected to, as discussed in more detail below. As discussed above, a user or a client device 540 may be part of a group or a subscription plan. In other embodiments, client devices 540 or users that are part of the same group may be associated with the same network access controller 515 in the NAC table. This may allow the packets (e.g., the data packets or layer 2 packets) from the client device 540 that are in the same group or subscription plan, to be forwarded to the same network access controller 515. Because the packets from the client devices that are in the same group or subscription plan are forwarded to the same network access controller 515, this may allow the system architecture 500 to more easily enforce the network policy or group policy for the client devices 540 in the group, as discussed in more detail below.

In one embodiment, a client device 540 or user may be part of multiple groups. For example, a client device 540 may be associated with different group subscriptions. The client device 540 may be part of a first group subscription for a user's work, and may be part of a second group subscription for the user's family. The network access controller 515 may determine which group policy should be applied based if a client device 540 is part of multiple group subscriptions or group policies. For example, if a client device 540 is located at the user's work place, then the first group subscription is used. If the client device 540 is located in the user's home, then the second group subscription may be used.

In one embodiment, different client devices 540 may be allocated to different network access controllers 515. For example, the client devices 540 that are allocated to a network access controller 515 may be referred to as a client group. A client group may include client devices 540 from multiple groups or group subscriptions. In addition, the client group for a network access controller 515 may be modified. For example, a network administrator may add client devices 540 to a client group or remove client devise from a client group.

The network access controllers 515 may be coupled to one or more networks, such as public networks (e.g., the internet) or private networks (e.g., a corporate network). In one embodiment, a network access controller 515 may receive the encapsulated packet from a packet forwarding component 520 via a tunnel between the network access controller 515 and the packet forwarding component 520. The network access controller 515 may decapsulate, unwrap, etc., the encapsulated packet to obtain the data packet (e.g., the layer 2 packet) that was transmitted by a client device 540 to an access point 530. The network access controller 515 may analyze one or more of the encapsulated packet or the data packet to identify a network policy (e.g., a network policy for a user, a group policy for a group of users, etc.). For example, the network access controller may identify the source MAC address (which may be the MAC address of a client device 540) to identify a network policy or a group policy associated with the client device 540 that transmitted the data packet. The network access controller 515 may determine whether, when, and how to forward the data packet to one or more networks (e.g., the internet) based on the data policy or group policy, as discussed in more detail below.

As discussed, adding additional packet forwarding components a system architecture that users layer 2 packets may result in more difficulties, issues, problems, etc., for the system architecture. For example, it may be more difficult for the system architecture to forward or route layer 2 packets to different network access controllers 515. In addition, more expensive network devices may be used to interconnect the access points 130, the packet forwarding components 120, and the network access controllers 115 in order for the network devices to store the MAC addresses of many or all of the client devices 140 in the system architecture.

In some embodiments, the system architecture 500 communicates (e.g., transmits or receives) encapsulated packets instead of layer 2 packets between the access points 130, the packet forwarding components 120, and the network access controllers 115. This allows the network devices that interconnect the access points 130, the packet forwarding components 120, and the network access controllers 115 to store fewer MAC addresses in their forwarding tables because the MAC addresses of the client devices 540 are not exposed to the network devices. Instead, the MAC addresses of the access points 130, the packet forwarding components 120, and the network access controllers 115 may be used in the encapsulated packets (e.g., the layer 3 packets). The total number of MAC addresses for the access points 130, the packet forwarding components 120, and the network access controllers 115 may be far fewer that the total number of MAC addresses for the client devices 540. The tunnel devices 560 may allow the system architecture 500 to use encapsulated packets by encapsulating the data packets (e.g., layer 2 packets) received form the client devices 540.

In other embodiments, the system architecture 500 may be able to route the encapsulated packets between the access points 130, the packet forwarding components 120, and the network access controllers 115 more easily. Because the encapsulated packets are at a higher layer (e.g., at the network layer or layer 3) than the data packets (which are at the data link layer or at layer 2), the system architecture 500 may be able to use internet protocol (IP) layer routing protocols, standards, techniques, methods, operations, etc., to route the encapsulated packets between the access points 130, the packet forwarding components 120, and the network access controllers 115. For example, if there are multiple paths through the network devices that interconnect the access points 130, the packet forwarding components 120, and the network access controllers 115 and one of the network devices is inoperable (e.g., crashes, fails, or is otherwise unavailable), IP routing protocols may be used to reroute the encapsulated packets through another path. This allows the system architecture 500 to be more fault tolerant and to recover from errors more quickly or efficiently.

Although the present disclosure may refer to Wi-Fi, other types of communication protocols, access technologies, and infrastructure may be used. For example, instead of using a Wi-Fi network, a gigabit passive optical network (GPON) may be used. In another example, an Ethernet network may be used. For example, any protocol, access technology, or infrastructure that may be used to forward a client devices MAC address to a network access controller 515 may be used.

In addition, although the present disclosure may describe packets that are transmitted from client devices 540 to network controllers 515, packets may also be transmitted from network access controllers 515 to the client devices 540. For example, after packets are transmitted from a client device 540 to a network controller 515, the network access controller 515 may be aware of the IP address that has been assigned to the client device 540 (e.g., the network access controller 515 may assign the IP address to the client device 540). The network access controller 515 may also be aware of the MAC address for the client device 540. The network access controller 515 may store the association of the IP address and the MAC address for the client device, in a table, such as an ARP table or a similar type of table. This allows the network access controller 515 to determine the IP address of a client device 540 based on the MAC address of the client device 540 and without using ARP broadcasts.

In one embodiment, the system architecture 500 may provide lower cost broadband service to millions of users, homes, and businesses. The system architecture 500 may be able to scale to aggregate speeds of hundreds of gigabits or terabits per second. For example, as different types of access technologies or protocols are developed (e.g., $5^{th}$ Generation (5G) protocols, $6^{th}$ Generation (6G) protocols, etc.), are developed, the access points 530 may be replaced with different access points that support newer access technologies. In addition, the system architecture permits the integration of thousands, hundreds of thousands, etc., of Wi-Fi access points (or other types of access points), each having different antenna configurations and each from a different vendor. This allows the system architecture to be used with all types of access points, starting from higher end access points with more functions to lower end access points. The system architecture 600 may be able to provide various solutions for providing network access using access technologies ranging from long range Wi-Fi for rural areas, fiber to the home (FTTH) or GPON for more developed urban areas, to enterprise grade access points for corporations or businesses. By using layer 2 or layer 3 protocols, and by using lower cost access points (e.g., by using Wi-Fi access points instead of cell towers), the system architecture 500 is able to provide lower cost and high performance broadband service (e.g., provide network access) to millions of users or households. For example, the system architecture 500 may be able to deploy outdoor Wi-Fi access points to cover millions of households at $\frac{1}{30}^{th}$ of the cost of an LTE network with similar capability.

Figure 6:
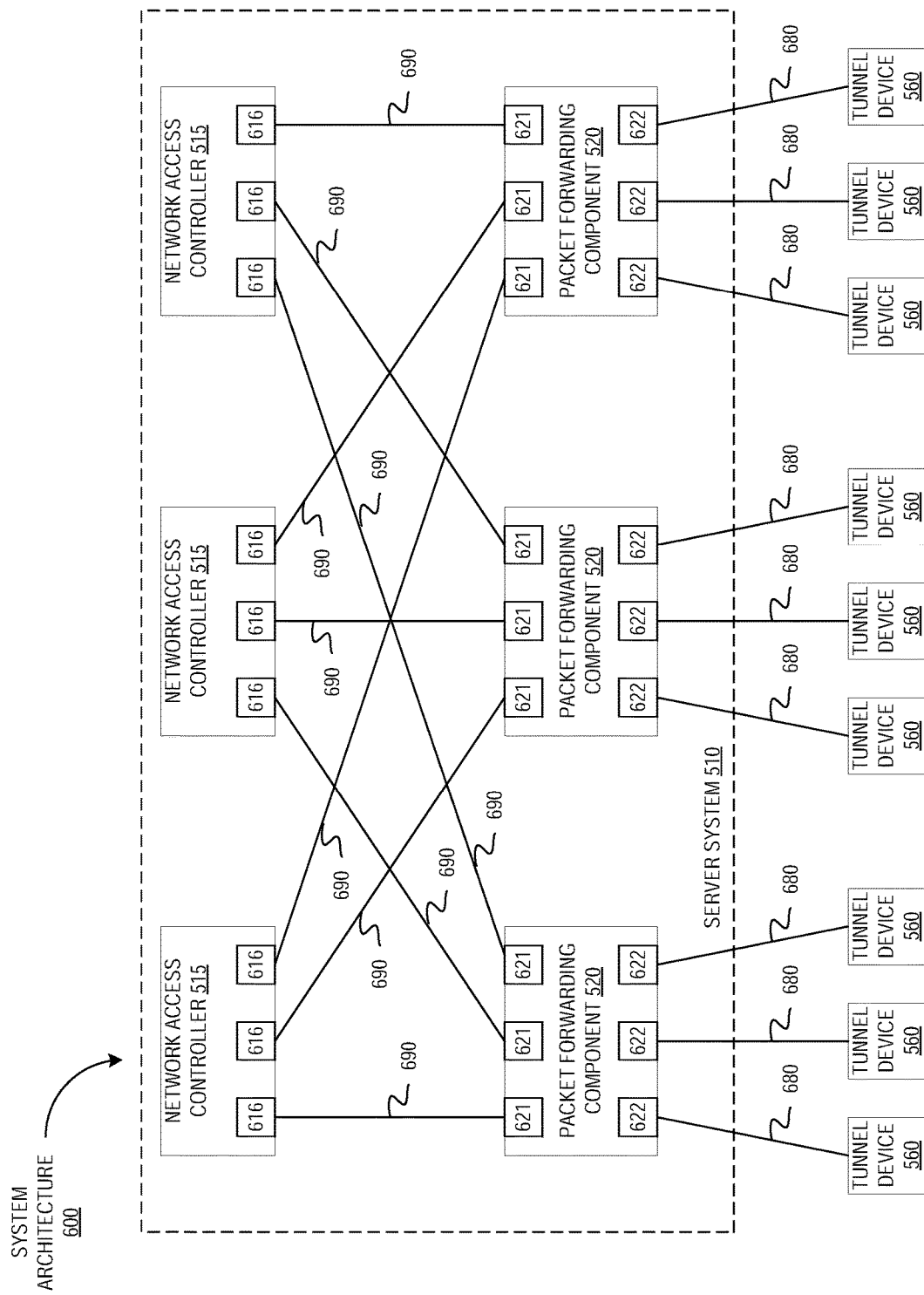
FIG. 6 is a block diagram that illustrates an example system architecture, in accordance with some embodiments of the present disclosure.

FIG. 6 is a block diagram that illustrates an example system architecture 600, in accordance with some embodiments of the present disclosure. The system architecture 600 includes a server system 510, and tunnel devices 560. The server system 510, the authentication server 550 and the tunnel devices 560 may be interconnected or coupled to each other (e.g., communicatively coupled) via one or more networks. The server system 510 includes network access controllers 515 and packet forwarding components 520. The network access controllers 515 and packet forwarding components 520 may also be interconnected or coupled to each other via one or more networks. The one or more networks may carry communications (e.g., messages, packets, frames, etc.) between the server system 510 and the tunnel devices 560. Each tunnel device may be coupled to one or more access points (e.g., access points illustrated in FIG. 5) and each access point may be coupled to one or more client devices (e.g., client devices illustrated in FIG. 5). The server system 510 may be located in one or more data centers or cloud computing architectures (e.g., clouds) that includes multiple computing devices, such as server computers. Each of the network access controllers 515, packet forwarding components 520, and tunnel devices 560, may be one or more of a computing device, a VM, or a container.

As discussed above, a tunnel device 560 may be coupled to one or more access points. Each tunnel device 560 may be coupled to access points that are within a geographical location. Each tunnel device 560 may be coupled to the one or more access points via a layer 2 connection or via a data link layer connection. For example, each tunnel device 560 may receive layer 2 packets from the access points. A tunnel device 560 may receive layer 2 packets (e.g., data packets) from a set of access points and may encapsulate those packets to generate encapsulated packets (e.g., layer 3 packets). The encapsulated packet may be a higher layer packet (e.g., a layer 3 or network layer packet) and the payload of the encapsulated packet may include a lower layer packet (e.g., a layer 2 or data link layer packet).

Each tunnel device 560 may be coupled to a packet forwarding component 520 via a tunnel 680. As discussed above, a tunnel 680 may be a communication channel used to communicate the encapsulated packets (e.g., may be a GRE tunnel, a L2TP tunnel, etc.). Each tunnel 680 is coupled to a tunnel device 560 at one end and an endpoint 622 on a packet forwarding component 520 at the other end. The endpoint 622 may be referred to as a tunnel endpoint. As discussed, the tunnels 680 may allow the tunnel devices 560 to be more easily reconnected to different packet forwarding components 520. The tunnels 680 may be used to communicate encapsulated packets (e.g., layer 3 packets, encapsulated layer 2 packets, etc.) between the tunnels devices 560 and the packet forwarding components 520. Although one tunnel 680 is illustrated between a tunnel device 560 and a packet forwarding component 520, a tunnel devices 680 may be coupled to multiple packet forwarding components 520 via multiple tunnels. This may allow a tunnel device 680 to switch between packet forwarding components 520 more quickly if a packet forwarding component 520. For example, rather than establishing a new tunnel 680 with a second packet forwarding component 520 when a first packet forwarding component 520 fails, the tunnel device 680 may use two tunnels and switch between the two tunnels when a packet forwarding component 520 fails.

In one embodiment, the packet forwarding component 520 may perform load balancing functions for the server system 510 by forwarding packets from different client devices to different network access controllers 515 to distribute the packets to different network access controllers 515. In another embodiment, the packet forwarding component 520 may forward packets to the same network access controller 515 regardless of which access point a client device is connected to, as discussed in more detail below. The packet forwarding component 520 may determine which network access controller 515 to forward a packet to, based on a NAC table, as discussed above. In another embodiment, the packet forwarding component 520 may also allow network access controllers 515 to be added to or removed from the system architecture 500.

Each packet forwarding component 520 is coupled to one or more of the network access controllers 515 via a tunnel 690 (e.g., a GRE tunnel, a VPN tunnel, a L2TP tunnel, etc.). Each tunnel 690 may be a communication channel used to communicate the encapsulated packets (e.g., may be a GRE tunnel, a L2TP tunnel, etc.). Each tunnel 690 is coupled to a network access controller 515 at an endpoint 616 and a packet forwarding component 520 at an endpoint 621. The endpoints 621 and 622 may be referred to as tunnel endpoints. The tunnels 690 may allow the packet forwarding components 520 to be more easily reconnected to different network access controllers 515. The tunnels 690 may be used to communicate encapsulated packets (e.g., layer 3 packets, encapsulated layer 2 packets, etc.) between the packet forwarding components 520 and the network access controllers.

In one embodiment, the packet forwarding component 520 may forward an encapsulated packet to one of the network access controllers 515. The packet forwarding component 520 may access a NAC table to determine which one of the network access controllers 515 should receive the encapsulated packet. The NAC table may include data indicating associations between one or more of user identifiers, MAC addresses of client devices, and MAC addresses of network access controllers 515. The associations may indicate which of the network access controllers 515 should be used for a particular client device or user. The packet forwarding component 520 may obtain the NAC table or may update the NAC table using various other methods, functions, operations, techniques etc. The NAC table or packet forwarding component 520 may associate different client devices with different network access controllers 515 based on geographical regions of the client devices. The NAC table or packet forwarding component 520 may also associate different client devices with different network access controllers 515 based on a different subscriptions or network plans.

The packet forwarding component 520 may update or modify the destination MAC address of the packet from the MAC address of the default network access controller, to the MAC address of the appropriate network access controller 515 associated with the MAC address of the client device, based on the NAC table. The packet forwarding component 520 may then forward the packet to the network access controller 515 that is associated with the MAC address of the client device.

In one embodiment, the packet forwarding component 520 may forward or transmit an encapsulated packet to a network access controller 515 that was identified or selected based on the NAC table. The packet forwarding component 520 may transmit the encapsulated packet to the identified network access controller 515 via a respective tunnel 690 between the between the packet forwarding component 520 and the identified network access controller 515. The packet forwarding component 520 may forward packets from a client device to the same network access controller 515 regardless of which access point a client device is connected to, as discussed in more detail below.

In one embodiment, a network access controller 515 may perform various functions, actions, operations, etc., related to providing the client devices with access to one or more networks (e.g., the internet, etc.). A network access controller 515 may authenticate or authorize the client devices before providing the client devices with access to one or more networks. In another embodiment, a network access controller 515 may provide network policy handling or enforcement functions (e.g., enforce a max download speed, enforce a data limit, etc.). For example, the network access controller 515 may allow client devices to transmit or receive packets based on a network policy, a group policy, etc. As discussed above, a group policy may be associated with a group of client devices that are on a group subscription plan (e.g., a group of client devices that share a same subscription plan). The group policy may be used to control the download speed, amount of time, etc., for multiple users who are enrolled in group subscription plan (e.g., an internet access subscription plan, a family plan, a shared plane, etc.). Packets from the client devices in the group subscription plan may be forwarded to the same network access controller 515 regardless of which access point the client devices are connected to. The same network access controller 515 may use the group policy to enforce network policies on the group of client devices. Client devices or users that are part of the same group may be associated with the same network access controller 515 in the NAC table.

The network access controllers 515 may be coupled to one or more networks, such as public networks (e.g., the internet) or private networks (e.g., a corporate network). In one embodiment, a network access controller 515 may receive the encapsulated packet from a packet forwarding component 520 via a tunnel between the network access controller 515 and the packet forwarding component 520. The network access controller 515 may decapsulate, unwrap, etc., the encapsulated packet to obtain the data packet (e.g., the layer 2 packet) that was transmitted by a client device to an access point. The network access controller 515 may analyze one or more of the encapsulated packet or the data packet to identify a network policy (e.g., a network policy for a user, a group policy for a group of users, etc.). For example, the network access controller may identify the source MAC address (which may be the MAC address of a client device) to identify a network policy or a group policy associated with the client device that transmitted the data packet. The network access controller 515 may determine whether, when, and how to forward the data packet to one or more networks (e.g., the internet) based on the data policy or group policy, as discussed in more detail below.

In one embodiment, each network access controller 515 may also user port isolation groups. Different endpoints 622 and 621 of each network access controller 515 may be grouped into different port isolation groups. For example, endpoints 621 may be in a first port isolation group and endpoints 622 may be in a second port isolation group.

In one embodiment, endpoints within a port isolation group may not be able to forward packets among each other. For example, packets may not be allowed to go from a first endpoint 622 of a packet forwarding component 520 to a second endpoint 622 of the same packet forwarding component 620. This may help prevent packets from looping through a packet forwarding component 520 and bypassing a network access controller 515. This may also prevent packets from flooding through the server system 510. For example, address resolution protocol (ARP) packets may be used by the system architecture to map IP addresses to MAC addresses. If ARP packets are allowed to be forwarded between endpoints 621 on a packet forwarding component 520, this may allow the ARP packets to be looped or flooded continuously through the server system 510. In addition, port isolation groups may prevent flapping. Flapping may occur when a client device 540 appear switch between different packet forwarding components 520 rapidly because packets from the client device 540 are looped through the server system 510. In another embodiment, endpoints in different port isolation groups may be able to forward packets among each other. For example, an endpoint 621 (which is part of the first port isolation group) may be able to forward packets to an endpoint 622 (which is part of the second port isolation group).

As discussed above, the system architecture 600 may use encapsulated packets (e.g., layer 3 packets, IP packets) between the access points 130, the packet forwarding components 120, and the network access controllers 115. The system architecture 600 may be able to use internet protocol (IP) layer routing protocols, standards, techniques, methods, operations, etc., to route the encapsulated packets between the access points 130, the packet forwarding components 120, and the network access controllers 115. This allows the system architecture 500 to be more fault tolerant and to recover from errors more quickly or efficiently. In addition, the user of tunnel devices to generate the encapsulated packets allows the server system 510 to add additional packet forwarding components 520 to the server system 510 more quickly, easily, and efficiently.

Figure 7:
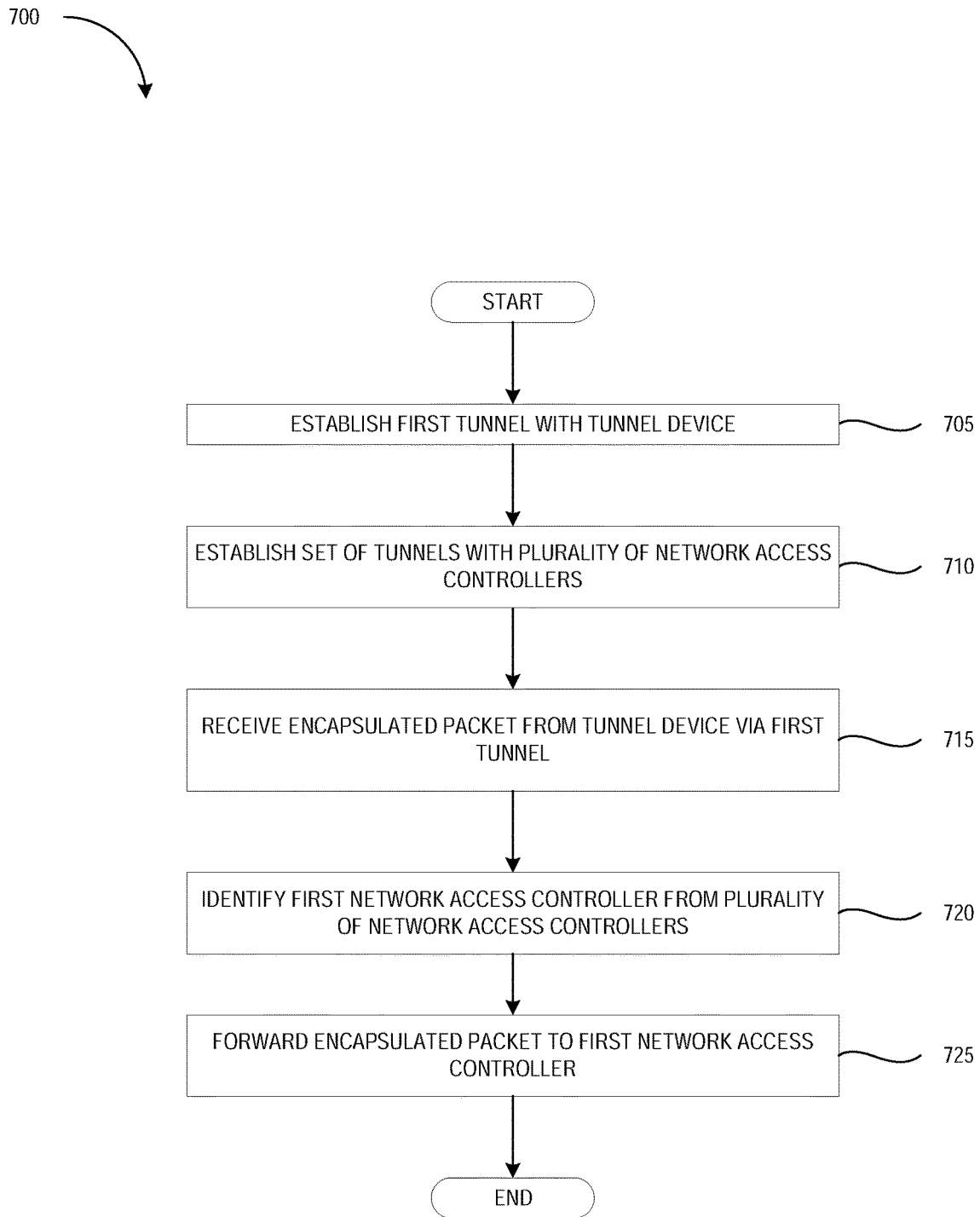
FIG. 7 is a flow diagram of a method of forwarding a packet, in accordance with some embodiments of the present disclosure.

FIG. 7 is a flow diagram of a method 700 of forwarding a packet, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 700 may be performed by one or more of a packet forwarding component, a network access controller, a tunnel device, an access point, and/or a computing device.

The method 700 begins at block 705, where the method 700 may establish a first tunnel with a tunnel device. The tunnel may be between the tunnel device and a packet forwarding component, as illustrated in FIG. 6. At block 710, the method 700 establishes a set of tunnels with a plurality of network access controllers. For example, the method 700 may establish a tunnel between each network access controller and a packet forwarding component, as illustrated in FIG. 6. At block 715, the method 700 may receive an encapsulated packet from the tunnel device via the first tunnel. The encapsulated packet may be a layer 3 packet, as discussed above. The encapsulated packet may include a data packet (e.g., a data link layer packet, a layer 2 packet, etc.) that was received by an access point from a client device, and that was encapsulated by the tunnel device.

At block 720, the method 700 may identify a first network access controller from the plurality of network access controllers. For example, method 700 may identify the source MAC address in the encapsulated packet (e.g., the MAC address of the client device that transmitted the data packet to an access point). The method 700 may access an NAC table to identify the network access controller and the MAC address of the first network access controller, which is associated with the MAC address of the client device, based on the table.

At block 725, the method 700 may forward the encapsulated packet to the first network access controller. For example, the method 700 may update the destination MAC address in the encapsulated packet from the MAC address of the default network access controller to the MAC address of the first network access controller (that is associated with the client device).

Figure 8:
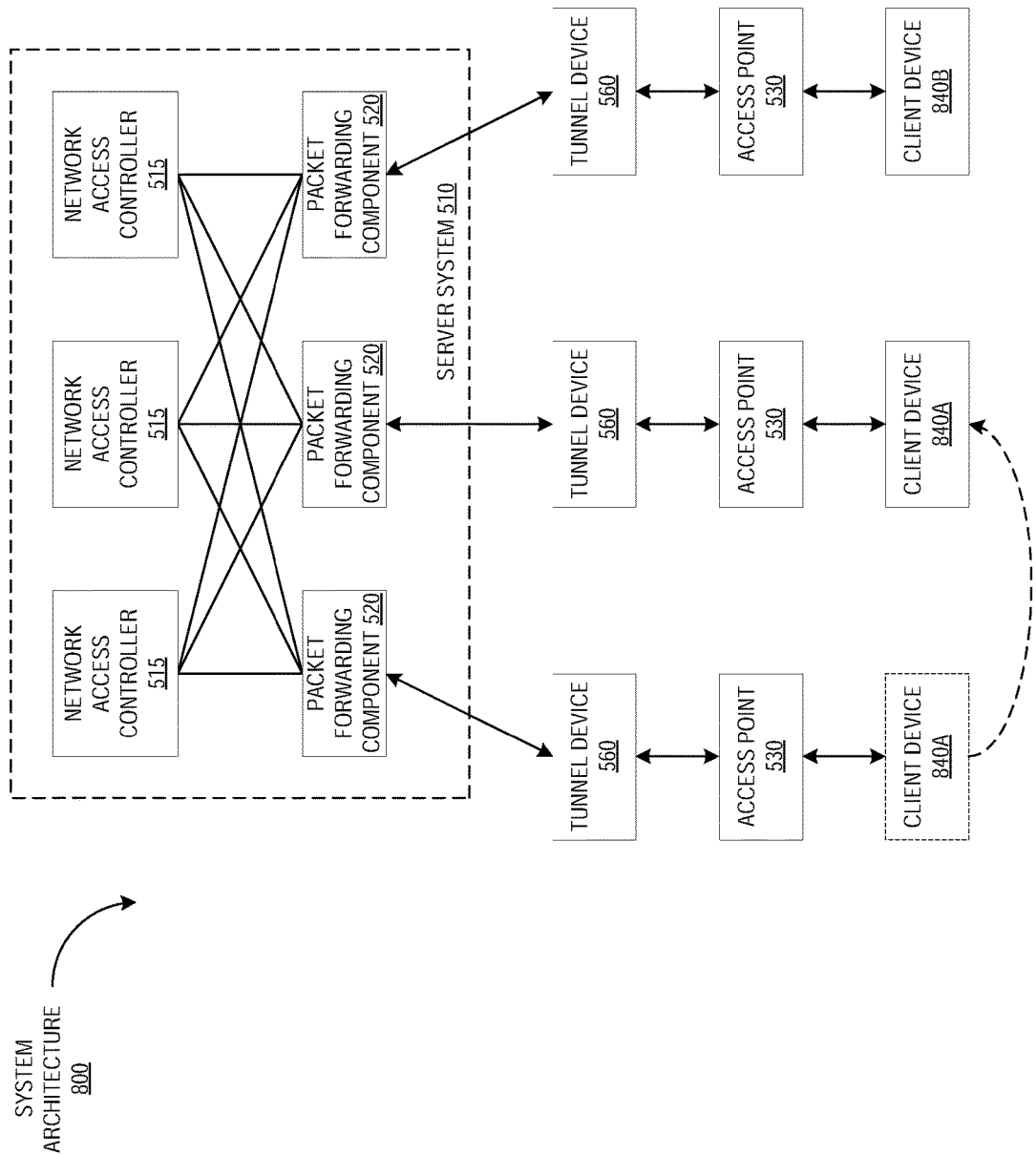
FIG. 8 is a block diagram that illustrates an example system architecture, in accordance with some embodiments of the present disclosure.

FIG. 8 is a block diagram that illustrates an example system architecture 800, in accordance with some embodiments of the present disclosure. The system architecture 800 includes a server system 510, and tunnel devices 560. The server system 510 and the tunnel devices 560 may be interconnected or coupled to each other (e.g., communicatively coupled) via one or more networks. The server system 510 includes network access controllers 515 and packet forwarding components 520. The network access controllers 515 and packet forwarding components 520 may also be interconnected or coupled to each other via one or more networks. Each tunnel device 560 may be coupled to one or more access points 530 and each access point may be coupled to one or more client devices. Each of the network access controllers 515, packet forwarding components 520, and tunnel devices 560, may be one or more of a computing device, a VM, or a container.

In some embodiments, the server system 510 may act, operation, or function as if the server system 510 were a router. For example, the server system 510 may operate as if the server system 510 were a home router, a cable modem, a DSL modem, or some other CPE. This, the server system 510 may operate as a virtual router that is located within a cloud or data center, as discussed in more detail below.

As discussed above, a tunnel device 560 may be coupled to one or more access points 530 within a geographical location. Each tunnel device 560 may be coupled to the one or more access points 530 via a layer 2 connection or via a data link layer connection. A tunnel device 560 may receive layer 2 packets (e.g., data packets) from a set of access points and may encapsulate those packets to generate encapsulated packets (e.g., layer 3 packets). The encapsulated packet may be a higher layer packet and the payload of the encapsulated packet may include a lower layer packet. Each tunnel device 560 may be coupled to a packet forwarding component 520 via a tunnel. The tunnels may be used to communicate encapsulated packets (e.g., layer 3 packets, encapsulated layer 2 packets, etc.) between the tunnels devices 560 and the packet forwarding components 520.

In one embodiment, the packet forwarding component 520 may perform load balancing functions for the server system 510 by forwarding packets from different client devices to different network access controllers 515 to distribute the packets to different network access controllers 515. The packet forwarding component 520 may determine which network access controller 515 to forward a packet to, based on a NAC table, as discussed above. The NAC table may include data indicating associations between one or more of user identifiers, MAC addresses of client devices, and MAC addresses of network access controllers 515. The associations may indicate which of the network access controllers 515 should be used for a particular client device or user. The packet forwarding component 520 may update or modify the destination MAC address of the packet from the MAC address of the default network access controller, to the MAC address of the appropriate network access controller 515 associated with the MAC address of the client device, based on the NAC table.

Each packet forwarding component 520 is coupled to one or more of the network access controllers 515 via a tunnel (e.g., a GRE tunnel, a VPN tunnel, a L2TP tunnel, etc.). The tunnels may allow the packet forwarding components 520 to be more easily reconnected to different network access controllers 515. The tunnels may be used to communicate encapsulated packets (e.g., layer 3 packets, encapsulated layer 2 packets, etc.) between the packet forwarding components 520 and the network access controllers.

In one embodiment, a network access controller 515 may perform various functions, actions, operations, etc., related to providing the client devices with access to one or more networks (e.g., the internet, etc.). For example, a network access controller 515 may authenticate or authorize the client devices before providing the client devices with access to one or more networks.

The network access controllers 515 may be coupled to one or more networks, such as public networks (e.g., the internet) or private networks (e.g., a corporate network). The network access controllers 515 may allow a client device to communicate with the one or more networks, via the network access controllers 51. For example, a network access controller 515 may allow a client device to transmit packets to and receive packets from the internet, via the network access controller 515.

In another embodiment, a network access controller 515 may provide network policy handling or enforcement functions (e.g., enforce a max download speed, enforce a data limit, etc.). For example, the network access controller 515 may allow client devices to transmit or receive packets based on a network policy. As discussed above, the NAC tables of the packet forwarding components 520 may be setup such that the packets from a client device are forwarded to the same network access controller 515 by the packet forwarding components 520. This helps to ensure that the same network access controller 515 is used to enforce network policies on the packets that are transmitted or received by the client device. This may also make it easier for network access controller 515 to enforce the network policies because the network access controller 515 does not need to coordinate with other network access controllers 515 in order to enforce the network policies The network access controller 515 may also enforce a group policy. A group policy may be a network policy that is associated with a group of client devices (e.g., client devices 840A and 840B). The group of client devices may be using a group subscription plan (e.g., the group of client devices may share a same subscription plan). The group policy may be used to control the download speed, amount of time, etc., for multiple client device or users who are enrolled in group subscription plan (e.g., an internet access subscription plan, a family plan, a shared plane, etc.). The NAC tables on the packet forwarding components 520 may be setup such that the packets from a client devices that are on the enrolled in or part of a group subscription plan are forwarded to the same network access controller 515 by the packet forwarding components 520.

For example, as illustrated in FIG. 8, client devices 840A and 840B may be part of a group subscription plan and the NAC tables in the packet forwarding components 520 may indicate that packets or data from the client devices 840A and 840B should be forwarded to the leftmost network access controller 515. Thus, a group policy (e.g., a network policy that is applied to multiple client devices in a group subscription plan) may be enforced on or applied to the client devices 840A and 840B. The group policy may indicate one or more of a maximum bandwidth (e.g., a max throughput, a max download speed), a data limit (e.g., the amount of data that may be downloaded), time limits (e.g., the amount of time that a client device may be online or communicating packets with a network), etc. Because the NAC tables in the packet forwarding components 520 may forward all of the packets from the client devices 840A and 840 to leftmost network access controller 515 (e.t., the same network access controller), the leftmost network access controller 515 may be able to enforce or apply the group policy more easily. For example, the leftmost network access controller 515 may not coordinate with the other network access controllers 515 to enforce of apply the group policy because the other network access controllers are not processing packets from the client devices 840A and 840B.

In one embodiment, a network access controller 515 may be apply or enforce a network policy on the client devices as the client devices move (e.g., traverse) from one access point 530 to another. For example, a client device 840A may be using the leftmost access point 530 which may be in a first city. At a later time, the client device 840A may move to a second city and may use the middle access point 530 which may be located in the second city. The NAC tables of the packet forwarding components maybe setup to forward the packets from the client device 840 to the leftmost access point 530 regardless of whether the client device 840 is using the leftmost access point 530, the middle access point 530, or other access points. This may allow the server system 510 to operate as a virtual or virtualized router which provides access to one or more networks (e.g., the internet) and is able to enforce a network policy on the client devices.

In one embodiment, a network access controller 515 may be apply or enforce a group policy on the client devices that are part of a group subscription plan (e.g., client devices 840A and 840B), as the client devices (in the group subscription plan) move from one access point 530 to another. For example, the group subscription plan may indicate a maximum bandwidth that may be shared by the client devices in the group subscription plan. As illustrated in FIG. 8, client device 840A may be connected to the middle access point 530 and client device 840B may be connected to the rightmost access point 530. Because all of the packets communicated with the client devices 840A and 840B go through the leftmost network access controller 515, the leftmost network access controller 515 may be able to enforce the maximum bandwidth on both the client device 840A and 840B. For example, the group subscription may indicate that a maximum bandwidth of 100 megabits per second (Mbps) should be shared by the client devices 840A and 840B. The leftmost network access controller 515 may allow the client device 840A to use 50 Mbps of bandwidth and may allow the client device 840B to use 50 Mbps of bandwidth. In other examples, the leftmost network access controller 515 may divide the 100 Mbps of bandwidth between the client devices 840A and 840B such that the total bandwidth used by the client devices 840A and 840B does not exceed 100 Mbps.

In one embodiment, the leftmost network access controller 515 may be able to apply these bandwidth restrictions on the client devices 840A and 840B regardless of which access points the client devices 840A and 840B use because all of the packets communicated by the client devices 840A and 840B go through the leftmost network access controller 515 (e.g., due to how the NAC tables on the packet forwarding components 520 are setup or configured). This may allow the server system 510 to operate as a virtual or virtualized router which provides access to one or more networks (e.g., the internet) and is able to enforce a network policy on client devices that are in a group subscription. For example, a cable modem or router may enforce a maximum bandwidth on client devices that are coupled to the cable modem or router. All of the devices coupled the cable modem or router may share the maximum bandwidth. The server system 510 allows the system architecture 800 to emulate or operate as a router (e.g., operate as a virtual router or a virtualized router) and enforce a maximum bandwidth (e.g., a network policy) on the client devices 840A and 840B.

Figure 9:
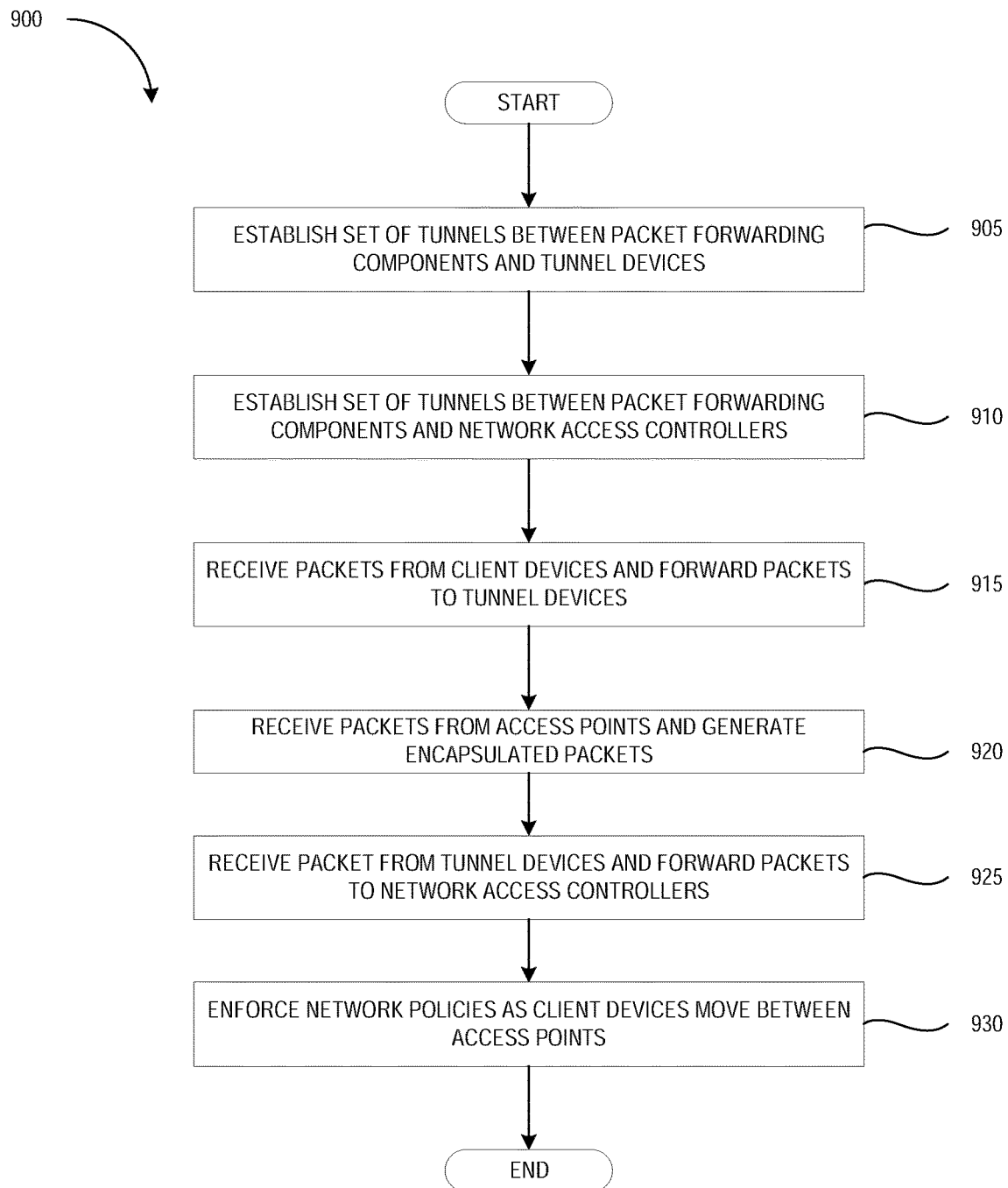
FIG. 9 is a flow diagram of a method of forwarding a packet, in accordance with some embodiments of the present disclosure.

FIG. 9 is a flow diagram of a method 900 of forwarding a packet in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 900 may be performed by one or more of a packet forwarding component, a network access controller, a tunnel device, an access point, and/or a computing device.

The method 900 begins at block 905, where the method 900 may establish tunnels between packet forwarding components and tunnel devices, as illustrated in FIG. 6. At block 910, the method 900 may establish tunnels between the packet forwarding components and the network access controllers, as illustrated in FIG. 6. At block 915, the method 900 may receive packets from the client devices and forward the packets to the tunnel devices. For example, the access points may receive data packets (e.g., layer 2 packets) from the client devices and forward the data packets to the tunnel devices. At block 920, the tunnel devices may receive the data packets from the access points and may generate encapsulated packets (e.g., layer 3 packets). The tunnels devices may also forward the encapsulated packets to the packet forwarding components.

At block 925, the method 900 may receive the packet from the tunnel devices and forward the packets to network access controllers. For example, the packet forwarding components may receive the encapsulate packets from the tunnel devices and may forward the encapsulated packets to the network access controllers based on NAC tables. At block 930, the method 900 may enforce one or more network policies on the client devices as the client devices move between different access points. For the network access controllers may enforce the a network policy on client devices that are in a group subscription, as the client devices move between different access points, as discussed above.

Figure 10:
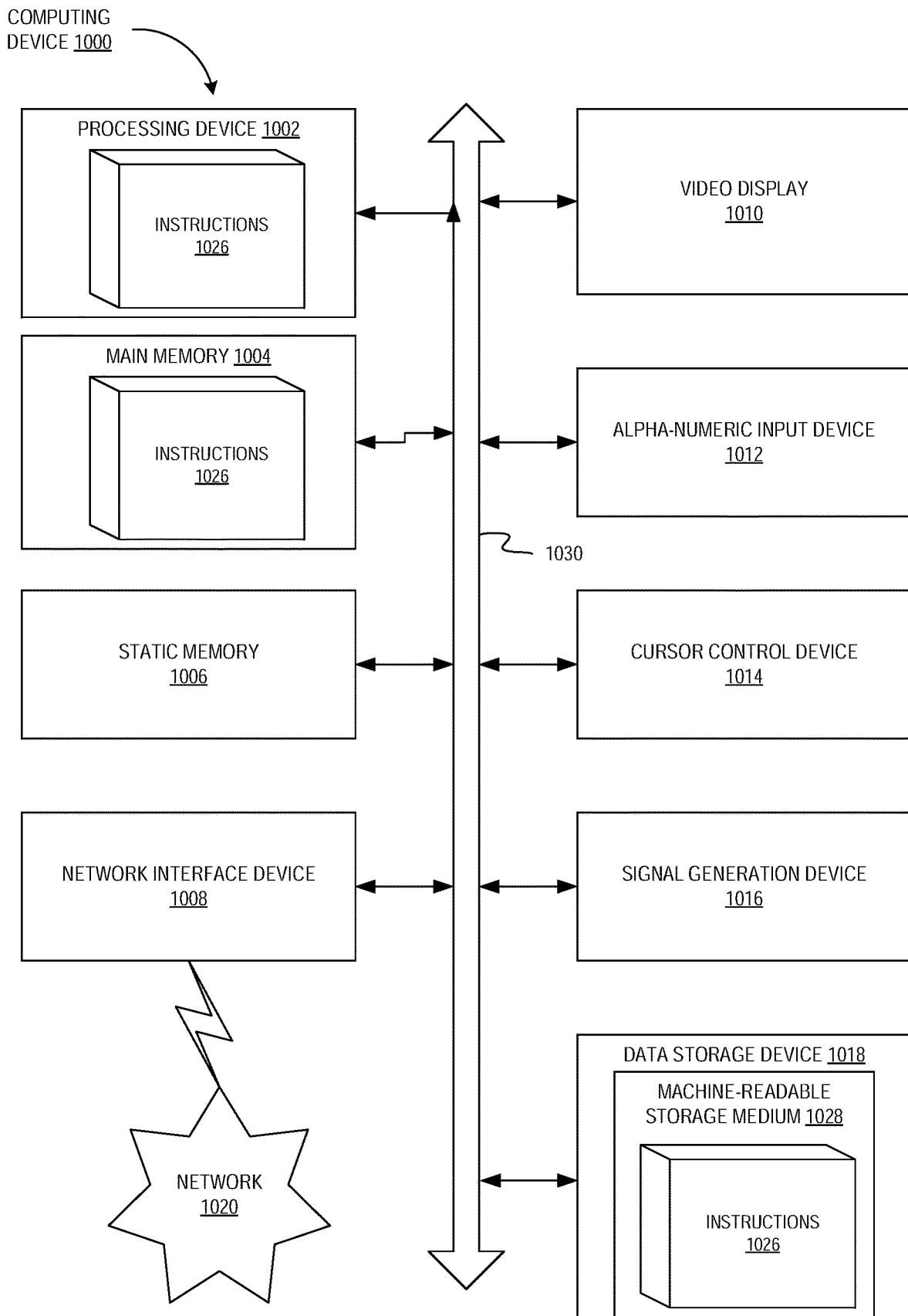
FIG. 10 is a block diagram of an example computing device that may perform one or more of the operations described herein, in accordance with some embodiments of the present disclosure.

FIG. 10 is a block diagram of an example computing device 1000 that may perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In some embodiments, the computing device 1000 may be one or more of an access point and a packet forwarding component.

The example computing device 1000 may include a processing device (e.g., a general purpose processor, a PLD, etc.) 1002, a main memory 1004 (e.g., synchronous dynamic random access memory (DRAM), read-only memory (ROM)), a static memory 1006 (e.g., flash memory and a data storage device 1018), which may communicate with each other via a bus 1030.

Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions, e.g., instructions for carrying out the operations described herein, in accordance with one or more aspects of the present disclosure. Instructions 1026 implementing one or more of a packet forwarding component, a network access controller, a tunnel device, and an access point, may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "generating," "identifying," "enforcing," "forwarding," "determining," "allocating," "establishing," "updating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system, comprising:
   a plurality of access points, wherein the plurality of access points receives data packets from a plurality of client devices;
   a plurality of tunnel devices coupled to the plurality of access points, wherein the plurality of tunnel devices generate encapsulated packets based on the data packets received by the plurality of access points;

a plurality of packet forwarding components coupled to the plurality of tunnel devices via a first set of tunnels, wherein the plurality of packet forwarding components receive the encapsulated packets from the plurality of tunnel devices and forward the encapsulate packets; and a plurality of network access controllers coupled to the plurality of packet forwarding components via a second set of tunnels, wherein the plurality of network access controllers enforce one or more network policies for the plurality of client devices, as the plurality of client devices move between the plurality of access points, wherein each client device of the plurality of client devices is associated with a respective network access controller of the plurality of network access controllers, and wherein the respective access controller enforces a network policy for the client device as the client device moves between the plurality of access points.

2. The system of claim 1, wherein the plurality of packet forwarding components forward a set of encapsulated packets generated based on a set of data packets from a first client device to a same network access controller of the plurality of network access controllers as the first client device moves between the plurality of access points.

3. The system of claim 2, wherein the same network access controller is identified further based on mapping data associating a first MAC address of the same network access controller and a second MAC address of the first client device.

4. The system of claim 2, wherein:
the set of encapsulated packets are decapsulated by the same network access controller to obtain a set of decapsulated packets; and
the set of decapsulated packets are forwarded to one or more networks by the same network access controller.

5. The system of claim 1, wherein:
a first client device is associated with a group policy;
a second client device is associated with the group policy;
the plurality of packet forwarding components forward a first set of encapsulates packets generated based on a first set of data packets from the first client device to a same network access controller of the plurality of network access controllers as the first client device moves between the plurality of access points; and
the plurality of packet forwarding components forward a second set of encapsulates packets generated based on a second set of data packets from the second client device to the same network access controller of the plurality of network access controllers as the second client device moves between the plurality of access points.

6. The system of claim 5, wherein the same network access controller is to:
determine that the first client device and the second client device are associated with the group policy;
allocate a first network bandwidth to the first client device based on the group policy; and
allocate a second network bandwidth to the second client device based on the group policy.

7. The system of claim 6, wherein:
the group policy indicates a total network bandwidth; and
a sum of the first network bandwidth and the second network bandwidth is less than or equal to the total network bandwidth.

8. The system of claim 1, wherein:
each tunnel device is coupled to a set of access points located in a different geographical area.

9. The system of claim 1, wherein:
the encapsulated packets comprise layer 3 packets; and
the data packets comprise layer 2 packets.

10. The system of claim 1, wherein:
at least two of the plurality of network access controllers are located within a data center; and
at least two of the plurality of packet forwarding components are located within the data center.

11. A method, comprising:
receiving, by a plurality of access points, data packets from a plurality of client devices;
generating, by a plurality of tunnel devices coupled to the plurality of access points, encapsulated packets based on the data packets received by the plurality of access points;
receiving, by a plurality of packet forwarding components coupled to the plurality of tunnel devices via a first set of tunnels, the encapsulated packets from the plurality of tunnel devices; and
enforcing, by a plurality of network access controllers coupled to the plurality of packet forwarding components via a second set of tunnels, one or more network policies for the plurality of client devices, as the plurality of client devices move between the plurality of access points, wherein each client device of the plurality of client devices is associated with a respective network access controller of the plurality of network access controllers, and wherein the respective access controller enforces a network policy for the client device as the client device moves between the plurality of access points.

12. The method of claim 11, further comprising:
forwarding, by the plurality of packet forwarding components, a set of encapsulated packets generated based on a set of data packets from a first client device to a same network access controller of the plurality of network access controllers as the first client device moves between the plurality of access points.

13. The method of claim 12, wherein the same network access controller is identified further based on mapping data associating a first MAC address of the same network access controller and a second MAC address of the first client device.

14. The method of claim 12, wherein:
the set of encapsulated packets are decapsulated by the same network access controller to obtain a set of decapsulated packets; and
the set of decapsulated packets are forwarded to one or more networks by the same network access controller.

15. The method of claim 11, wherein:
a first client device is associated with a group policy;
a second client device is associated with the group policy; and
the method further comprises:
forwarding, by the plurality of packet forwarding components, a first set of encapsulates packets generated based on a first set of data packets from the first client device to a same network access controller of the plurality of network access controllers as the first client device moves between the plurality of access points; and
forwarding, by the plurality of packet forwarding components, a second set of encapsulates packets generated based on a second set of data packets from the second client device to the same network access controller of the plurality of network access controllers as the second client device moves between the plurality of access points.

16. The method of claim 15, further comprising:

determining, by the same network access controller, that the first client device and the second client device are associated with the group policy;

allocating, by the same network access controller, a first network bandwidth to the first client device based on the group policy; and allocating, by the same network access controller, a second network bandwidth to the second client device based on the group policy.

17. The method of claim 16, wherein:

the group policy indicates a total network bandwidth; and a sum of the first network bandwidth and the second network bandwidth is less than or equal to the total network bandwidth.

18. The method of claim 11, wherein:

each tunnel device is coupled to a set of access points located in a different geographical area.

19. The method of claim 11, wherein:

the encapsulated packets comprise layer 3 packets; and the data packets comprise layer 2 packets.

20. The method of claim 11, wherein:

at least two of the plurality of network access controllers are located within a data center; and at least two of the plurality of packet forwarding components are located within the data center.

\* \* \* \* \*